(12) United States Patent
Ha et al.

(10) Patent No.: US 11,654,903 B2
(45) Date of Patent: May 23, 2023

(54) METHOD AND APPARATUS FOR PREVENTING ESCAPE OF AUTONOMOUS VEHICLE

(71) Applicants: HYUNDAI MOTOR COMPANY, Seoul (KR); KIA MOTORS CORPORATION, Seoul (KR); AJOU UNIVERSITY INDUSTRY-ACADEMIC COOPERATION FOUNDATION, Suwon-si (KR)

(72) Inventors: Jae Jun Ha, Hwaseong-si (KR); Ilsoo Yun, Yongin-si (KR); Sangmin Park, Chungcheongnam-do (KR); Sungho Park, Yongin-si (KR); Harim Jeong, Suwon-si (KR); Cheolwoo Kwon, Suwon-si (KR); Jiwon Kim, Suwon-si (KR); Kiyeon Park, Suwon-si (KR)

(73) Assignees: HYUNDAI MOTOR COMPANY, Seoul (KR); KIA MOTORS CORPORATION, Seoul (KR); AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 131 days.

(21) Appl. No.: 17/159,951

(22) Filed: Jan. 27, 2021

(65) Prior Publication Data
US 2021/0237725 A1    Aug. 5, 2021

(30) Foreign Application Priority Data

Jan. 30, 2020    (KR) ........................ 10-2020-0011142

(51) Int. Cl.
*B60W 30/095*    (2012.01)
*B60W 60/00*    (2020.01)
(Continued)

(52) U.S. Cl.
CPC .. *B60W 30/0956* (2013.01); *B60W 60/00272* (2020.02); *G06V 20/58* (2022.01);
(Continued)

(58) Field of Classification Search
CPC ......... G05D 2201/0213; G05D 1/0088; G05D 1/0246; G05D 1/0214; G05D 1/0274;
(Continued)

(56) References Cited

U.S. PATENT DOCUMENTS 10,019,857 B1 *  7/2018  Mcquillen ............... G07C 5/085
2017/0217429 A1 *  8/2017  Shioe ..................... B60W 30/08

* cited by examiner

*Primary Examiner* — Adam R Mott
*Assistant Examiner* — Erick T. Detweiler
(74) *Attorney, Agent, or Firm* — Morgan, Lewis & Bockius LLP

(57) ABSTRACT

A moving object escape prevention method includes: controlling, by a processor of a moving object, to drive the moving object based on autonomous driving; detecting, by the processor, whether a collision occurred by the moving object; in response to detecting the collision, transmitting, by the processor, a collision occurrence notification signal and position information of the moving object to an Intelligent Transportation System Infrastructure (ITSI); receiving, by the processor, escape-related information from the ITSI. The receiving escape-related information includes: determining, by the ITSI, whether or not the moving object escapes based on position information of the moving object; receiving, by the processor, accident handling information from the ITSI upon determining that the moving object does not escape, and receiving, by the processor, an escape (Continued)

warning message from the ITSI when the position information of the moving object changes.

21 Claims, 19 Drawing Sheets

(51) Int. Cl.
*H04W 4/46* (2018.01)
*G06V 20/58* (2022.01)
*B60W 30/08* (2012.01)

(52) U.S. Cl.
CPC ........ *H04W 4/46* (2018.02); *B60W 2030/082* (2013.01); *B60W 2554/4041* (2020.02); *B60W 2554/4046* (2020.02); *B60W 2554/4049* (2020.02)

(58) Field of Classification Search
CPC .... G05D 1/0278; G05D 1/0061; G05D 1/027; G05D 1/0272; G05D 1/0027; G05D 1/0287; G08G 1/166; G08G 1/161; B60W 50/14; B60W 10/20; B60W 10/18; B60W 30/09; B60W 30/0956; B60W 2556/50; B60W 30/16; B60W 40/06; B60W 2050/143; B60W 2420/52; B60W 2050/0075; B60W 50/00; B60W 2420/42; B60W 30/02; B60W 30/18154; B60W 30/095; B60W 2554/00; B60W 10/06; B60W 30/14; B60W 30/18172; B60W 30/04; B60W 40/076; B60W 2050/0071; B60W 2050/0073; B60W 40/072; B60W 40/09; B60W 2554/4041; B60W 10/04; B60W 2556/65; B60W 2050/146; B60W 40/08; B60W 10/184; B60W 2554/801; B60W 50/16; B60W 2520/10; B60W 2555/20; B60W 2720/10; B60W 60/0011; B60W 2556/45; B60W 30/143; B60W 30/18; B60W 60/0015; B60W 2540/18; B60W 30/085; B60W 30/12; B60W 2554/80; B60W 2756/10; B60W 2554/804; B60W 50/0097; B60W 2555/60; B60W 2710/20; B60W 40/02; B60W 60/0016; B60W 60/0017; B60W 2540/12; B60W 50/12; B60W 2420/60; B60W 2540/10; B60W 2710/00; B60W 2754/10; B60W 2050/046; B60W 2554/4046; B60W 60/0051; B60W 30/08; B60W 30/165; B60W 40/04; B60W 60/0025; B60W 2420/40; B60W 2520/105; B60W 30/0953; B60W 60/001; B60W 2030/082; B60W 2040/0872; B60W 2540/225; B60W 2540/30; B60W 2554/4023; B60W 60/00276; B60W 2050/048; B60W 2420/403; B60W 2540/221; B60W 30/18163; B60W 50/0098; B60W 2040/0818; B60W 2556/55; B60W 2710/18; B60W 40/105; B60W 50/10; B60W 60/0027; B60W 2040/0809; B60W 2520/14; B60W 2540/22; B60W 2540/229; B60W 2552/53; B60W 2556/60; B60W 60/00274; B60W 2540/043; B60W 2554/4042; B60W 2554/802; B60W 2556/00; B60W 30/00; B60W 50/085; B60W 60/0021; B60W 60/007; B60W 2050/0067; B60W 2050/0085; B60W 2400/00; B60W 2420/54; B60W 2520/04; B60W 2520/28; B60W 2530/20; B60W 2540/26; B60W 2552/30; B60W 2552/40; B60W 2554/20; B60W 2556/20; B60W 2720/106; B60W 2720/18; B60W 50/0205; B60W 10/00; B60W 10/08; B60W 10/22; B60W 2050/0082; B60W 2510/18; B60W 2510/20; B60W 2520/12; B60W 2552/00; B60W 2552/20; B60W 2554/4029; B60W 2556/05; B60W 2720/16; B60W 30/10; B60W 30/182; B60W 50/08; B60W 60/0053; B60W 10/10; B60W 10/30; B60W 20/00; B60W 2050/0018; B60W 2050/0052; B60W 2050/0059; B60W 2050/0095; B60W 2540/00; B60W 2540/223; B60W 2540/227; B60W 2554/402; B60W 2554/4026; B60W 2554/404; B60W 2556/35; B60W 2720/14; B60W 30/146; B60W 40/068; B60W 40/103; B60W 50/045; B60W 60/00; B60W 60/0018; B60W 60/00182; B60W 60/0023; B60W 60/0059; B60W 10/115; B60W 10/182; B60W 20/15; B60W 20/30; B60W 2040/0836; B60W 2040/0881; B60W 2050/0004; B60W 2050/0013; B60W 2050/0014; B60W 2050/0037; B60W 2050/0074; B60W 2050/0083; B60W 2050/021; B60W 2300/34; B60W 2510/08; B60W 2510/09; B60W 2510/182; B60W 2520/125; B60W 2520/26; B60W 2540/01; B60W 2540/045; B60W 2540/047; B60W 2540/14; B60W 2540/16; B60W 2540/21; B60W 2540/215; B60W 2552/15; B60W 2556/10; B60W 2556/40; B60W 2710/09; B60W 2710/22; B60W 2710/30; B60W 2720/00; B60W 2720/24; B60W 2900/00; B60W 30/025; B60W 30/06; B60W 30/162; B60W 30/18127; B60W 30/18145; B60W 30/18159; B60W 40/064; B60W 40/114; B60W 40/12; B60W 50/082; B60W 50/087; B60W 60/0013; B60W 60/00272; B60W 2030/043; B60W 2050/0002; B60W 2050/0011; B60W 2050/0031; B60W 2050/0057; B60W 2050/006; B60W 2520/18; B60W 2520/30; B60W 2552/50; B60W 2554/40; B60W 2554/4043; B60W 2554/4044; B60W 2554/4045; B60W 2554/4049; B60W 2554/803; B60W 2554/806; B60W 2710/06; B60W 2710/0605; B60W 2710/1005; B60W 2710/182; B60W 2710/202; B60W 2710/207; B60W 2720/28; B60W 2754/30; B60W 30/18181; B60W 40/10; B60W 40/13; B60W 50/02; B60W 50/029; B60W 60/00184; B60W 60/00186; B60W 60/005; B60W 2420/00
See application file for complete search history.

Hit and run -> Switch control right of autonomous driving and risk of further accident exists when being stopped CCTV is now mainly used to track hit-and-run vehicle or other vehicles Hit-and-run vehicle tracking and control system using ITSI

METHOD AND APPARATUS FOR PREVENTING ESCAPE OF AUTONOMOUS VEHICLE

CROSS REFERENCE TO RELATED APPLICATION

The present application claims the benefit of priority to Korean Patent Application No. 10-2020-0011142, filed Jan. 30, 2020 in the Korean Intellectual Property Office, the entire contents of which is incorporated herein for all purposes by this reference.

TECHNICAL FIELD

The present disclosure relates to a method and an apparatus for preventing escape when an accident occurs to an autonomous vehicle.

BACKGROUND

Along with technical advances, a vehicle can communicate with electronic devices using various communication methods. Here, not only electronic devices but also various apparatuses can be used, and communication methods using such apparatuses are evolving.

In particular, an autonomous vehicle, which can automatically recognize, determine and control a driving condition, utilizes information collected through various sensors and a V2X communication apparatus without the driver's manipulation. According to the standard proposed by the Society of Automotive Engineers (SAE), autonomous vehicles are defined by a total of 6 levels, among which Level 3 (conditionally autonomous), Level 4 (highly autonomous) and Level 5 (fully autonomous) correspond to autonomous driving in a real sense.

Such an autonomous vehicle may have an accident like a collision with a moving object. Therefore, an operating method for a case where an accident occurs to an autonomous vehicle so as to avoid escape of the autonomous vehicle is necessary.

The information included in this Background section is only for enhancement of understanding of the general background of the present disclosure and may not be taken as an acknowledgement or any form of suggestion that this information forms the prior art already known to a person skilled in the art.

SUMMARY

The present disclosure may provide a method and an apparatus for preventing escape of an autonomous vehicle, with consideration of preventing a further accident. In addition, the present disclosure may provide a method and apparatus for preventing the escape of an autonomous vehicle by using a surrounding infrastructure.

According to one aspect of the present disclosure, a method of preventing escape of a moving object includes: controlling, by a processor of the moving object, to drive the moving object based on autonomous driving; detecting, by the processor, whether a collision occurred by the moving object; in response to detecting the collision, transmitting, by the processor, a collision occurrence notification signal and position information of the moving object to an Intelligent Transportation System Infrastructure (ITSI); receiving, by the processor, escape-related information from the ITSI. The receiving escape-related information includes: determining, by the ITSI, whether or not the moving object escapes based on position information of the moving object; receiving, by the processor, accident handling information from the ITSI upon determining that the moving object does not escape, and receiving, by the processor, an escape warning message from the ITSI when the position information of the moving object changes According to another aspect of the present disclosure, a moving object is equipped with an escape prevention function includes: a transceiver for transmitting and receiving a signal and a processor for controlling the transceiver. The processor may detect that a collision occurs to the moving object that runs based on autonomous driving, transmit a collision occurrence notification signal and position information of the moving object to an ITSI, and receive escape-related information from the ITSI. Whether or not the moving object escapes may be determined based on the position information of the moving object through the ITSI. When the position information of the moving object is same, the moving object may receive accident handling information from the ITSI. When the position information of the moving object changes, the moving object may receive an escape warning message from the ITSI.

According to yet another aspect of the present disclosure, a method of preventing escape of a moving object includes: receiving a collision occurrence notification signal and position information of the moving object from the moving object when a collision occurs to the moving object; determining whether or not the moving object escapes based on the position information of the moving object; and transmitting escape-related information to the moving object. Herein, when the position information of the moving object is same, an ITSI may determine that the moving object does not escape and transmit accident handling information to the moving object. When the position information of the moving object changes, the ITSI may determine that the moving object escapes and transmit an escape warning message to the moving object.

According to the present disclosure, a method and apparatus for preventing the escape of an autonomous vehicle may be provided.

According to the present disclosure, a method of preventing the escape of an autonomous vehicle with consideration of preventing a further accident may be provided.

According to the present disclosure, a method and apparatus for preventing the escape of an autonomous vehicle by using a surrounding infrastructure may be provided.

The technical objects of the present disclosure are not limited to the above-mentioned technical objects, and other technical objects that are not mentioned will be clearly understood by those skilled in the art through the following descriptions.

DETAILED DESCRIPTION

Figure 1:
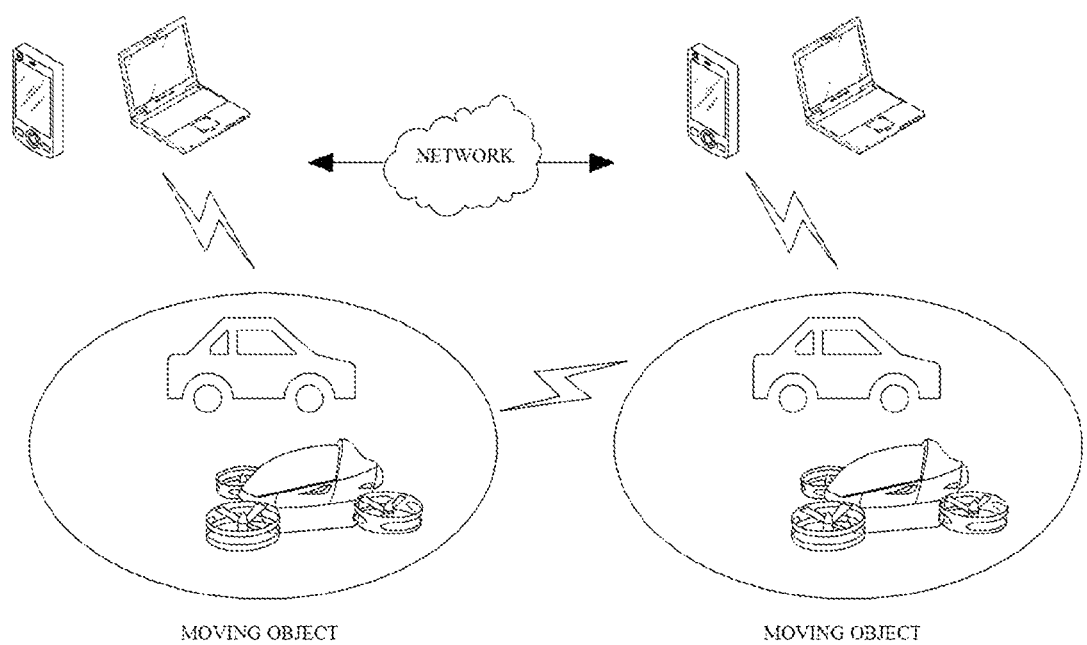
FIG. 1 is a view illustrating a method where a moving object communicates with another moving object or device through a network according to an embodiment of the present disclosure.

Hereinafter, embodiments of the present disclosure will be described in detail with reference to the accompanying drawings, which will be easily implemented by those skilled in the art. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, when a component is referred to as being "linked", "coupled", or "connected" to another component, it is understood that not only a direct connection relationship but also an indirect connection relationship through an intermediate component may also be included. When a component is referred to as "comprising" or "having" another component, it may mean further inclusion of another component not the exclusion thereof, unless explicitly described to the contrary.

In the present disclosure, the terms first, second, etc. are used only for the purpose of distinguishing one component from another, and do not limit the order or importance of components, etc. unless specifically stated otherwise. Thus, within the scope of this disclosure, a first component in one embodiment may be referred to as a second component in another embodiment, and similarly a second component in one embodiment may be referred to as a first component.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. Embodiments that include other components in addition to the components described in the various embodiments are also included in the scope of the present disclosure.

Advantages and features of the present disclosure, and methods for achieving them will be apparent with reference to the embodiments described below in detail with reference to the accompanying drawings. However, the present disclosure is not limited to the embodiments set forth below, but may be implemented in various forms, and the present embodiments are provided to make the disclosure of the present disclosure complete and to fully inform those of ordinary skill in the art of the scope of the present disclosure.

In an embodiment of the present disclosure, an Intelligent Transportation System Infrastructure (ITSI) may include at least one traffic facility device installed on a course (e.g., road, sea lane, etc.) where a moving object runs. When the course in which a moving object runs is a road, the traffic facility device may include a Road Side Unit (RSU). In addition, the traffic facility device installed on a road may function as an independent server. The traffic facility device may be connected to a server via a wired/wireless communication network and provide collected information to the server. In response to this, the server may configure and provide intelligent traffic information by using information or data provided by at least one traffic facility device. The traffic facility device may include an Internet of Things (IoT) terminal and an edge computing apparatus.

In addition, a road environment where a moving object is moved may be variously configured by a tollgate, a gate of a highway rest area, a gate of a drowsy shelter and the like, and various types of ITSIs may be installed in the road environment accordingly. The ITSI may basically communicate with each moving object running on a road. Moreover, the ITSI may be any other apparatus installed on a road, is not limited to the above-described embodiment and may be variously altered. Although an embodiment of the present disclosure describes that a course in which a moving object runs is a road, the present disclosure is not limited to the embodiment. The course in which a moving object runs may be changed in various ways depending on the type of moving object, and a traffic facility or server may also be changed variously.

FIG. 1 is a view illustrating a method where a moving object communicates with another moving object or device through a network. Referring to FIG. 1, a moving object may communicate with another moving object or another device. Herein, the moving object may communicate with another moving object or another device based on cellular communication, WAVE communication, dedicated short range communication (DSRC), or other communication schemes. That is, as a cellular communication network, a communication network such as LTE, 5G, WiFi communication network, WAVE communication network, etc. may be used. In addition, a local area network used in a moving object, such as DSRC may be used, and the present disclosure is not limited to the above-described embodiment.

In addition, for the purpose of security of a moving object with respect to communication of the moving object, a module capable of communicating only with a device inside the moving object and a module capable of communicating with a device outside the moving object may exist separately. For example, inside a moving object, communication based on the security may be performed only for a device within a certain range in the moving object, such as Wi-Fi communication. The moving object and a personal device owned by the moving object driver may include a communication module for performing only communication with each other. That is, the moving object and the personal device of the moving object driver may use a communication network disconnected from an external communication network. The moving object may include a communication module for performing communication with an external device. In addition, the above-described module may be implemented as a single module. In other words, based on a single module, a moving object may communicate with anther device, which is not limited to the above-described embodiment. That is, in a moving object, communication may be embodied based on various methods and is not limited to the above-described embodiment.

A moving object may refer to a device. For example, a moving object may be a vehicle (including an autonomous vehicle or an automated vehicle), a drone, a mobility, a mobile office, a mobile hotel, a PAV (Personal Air Vehicle), UAM (Urban Air Mobility), or eVTOL (Electric Vertical Take-Off and Landing). In addition, a moving object may be any other mobile device and is not limited to the above-described embodiments.

Figure 2:
FIG. 2 is a view illustrating the need for a method of preventing escape according to an embodiment of the present disclosure.
Figure 2:

FIG. 2 is a view showing the need for a method of preventing escape according to an embodiment of the prevent disclosure.

Referring to FIG. 2, when a moving object escapes after an accident, CCTV or manpower may be used to track the moving object. The moving object may be an autonomous vehicle and run based on autonomous driving, as described above. Herein, the autonomous vehicle may drive autonomously without the driver's control based on sensing information and other information received via communication. However, such an autonomous vehicle may have an accident like a collision with a moving object. An operating method for a case where an accident occurs to an autonomous vehicle may be required, which will be described below.

Figure 3A:
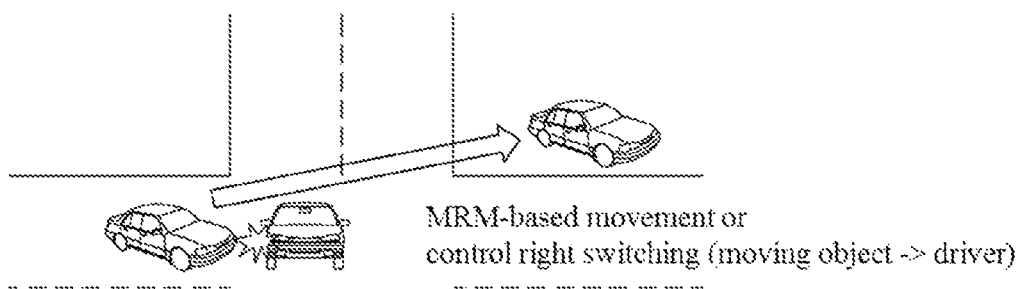
FIGS. 3A and 3B are views illustrating a process after an accident occurs to an autonomous vehicle according to an embodiment of the present disclosure.
Figure 3A:
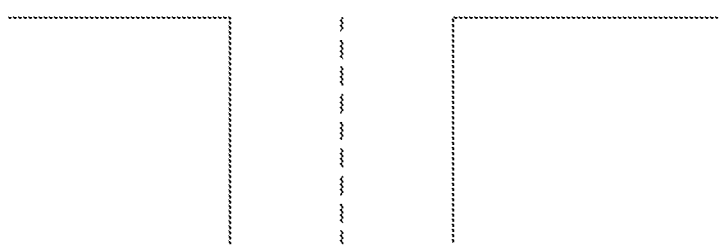
Figure 3B:
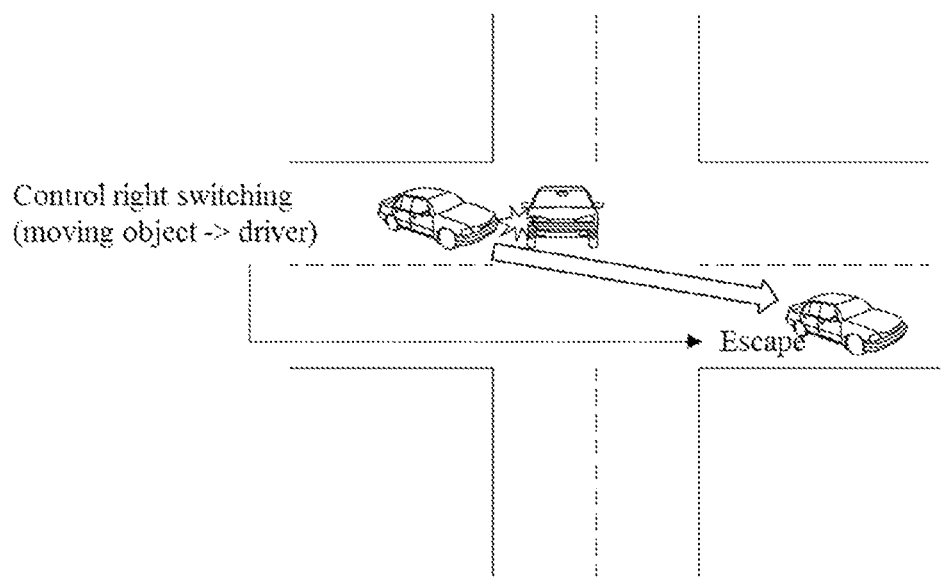

FIGS. 3A and 3B are views illustrating a process after an accident occurs to an autonomous vehicle according to an embodiment of the present disclosure.

Referring to FIG. 3A, a moving object may perform autonomous driving. The moving object may be equipped with radar, a camera, and other sensors for autonomous driving. For autonomous driving, a moving object may be equipped with a communication device for performing external communication. Herein, a moving object may perform autonomous driving by using external information sensed through equipment mounted on the moving object and other information obtained via communication. An event may occur to the autonomous vehicle. The event may refer to a collision with another moving object or a collision with a pedestrian or any other object. As an example, the responsibility of an accident may be attributed to a driver of an existing moving object, and the accident may be handled around the driver. However, in the case of an autonomous vehicle, a different criterion may be applied according to control rights. In the case of a moving object, when autonomous driving is not applied, the perception for a surrounding object may be performed by a driver, and the control of the moving object may also be performed by the driver. Accordingly, the responsibility for an accident may also be in the driver. On the other hand, depending on autonomous driving levels, the perception of a surrounding object may be performed by a driver, while the control of a moving object may be partially performed by the moving object itself. That is, autonomous operation may be possible only for some functions, and the responsibility for an accident may be attributed to the driver in the above-described case. For example, depending on autonomous driving levels, the perception of a surrounding object may be performed by a driver, while the control of a moving object may be wholly performed through the moving object. That is, the driver may have the only duty of perceiving and paying attention to a surrounding object. However, also in the above-described case, a responsibility may be attributed to the driver based on the duty of attention. On the other hand, when the autonomous driving level is getting so high that a moving object performs both the perception of surroundings and the control of the moving object, no responsibility may be attributed to a driver. In addition, as an example, in the above-described case, a responsibility may be attributed to the driver based on the duty of attention.

In the above-described case, even when autonomous driving is performed, the driver may be responsible for an accident, surveillance over a moving object may be needed, and an escape may occur by the driver even in the autonomous vehicle. For example, when an accident occurs to the autonomous vehicle, it is possible to deprive the driver of the control right of the moving object.

In the case of a moving object, an autonomous driving level and the control right of the moving object may be set based on a driver's choice. However, when an accident occurs to a moving object set to autonomous driving, the control right may not be switched to the driver, as described above. The autonomous vehicle may perform a minimum measure based on the Minimum Risk Management (MRM) function after an accident occurs. The MRM function is the moving object's active control of driving with consideration of the accident situation or risky situation. It may be a function for a minimum measure, which may be variously set. Referring to FIG. 3A, a moving object may move to a roadside or any other area free from risk of further accident after an accident occurs. In this regard, the MRM function may be set for a move to the roadside. That is, an autonomous vehicle may not switch control right to a driver when an accident occurs but perform a follow-up measure based on MRM in order to prevent a further accident.

However, when an accident occurs while autonomous driving is implemented in a moving object, a secondary accident may occur if the control right for the moving object is not provided to the driver. Since a moving object based on an autonomous driving system may have a limitation in handling an accident situation itself, it may be necessary to perform accident handling under a driver's control. Thus, an accident situation may be handled, and secondary damage may be prevented. In addition, when an accident occurs to a moving object for which autonomous driving is being implemented, it is worthy of considering a case where the control right is switched to a driver based on the system inability of the moving object. That is, when an accident occurs to a moving object in autonomous driving state, the basic function may be performing accident handling based on MRM function by controlling a driver's control right, but it is possible to consider a case where the control right is switched to the driver if necessary or based on an inevitable situation. Referring to FIG. 3B, a driver may flee after an accident based on a switched control right. That is, it is possible to consider an escape situation occurring to a moving object. A function for escape prevention may be needed in a moving object with consideration of the above-described escape situation, which will be described below.

Figure 4A:
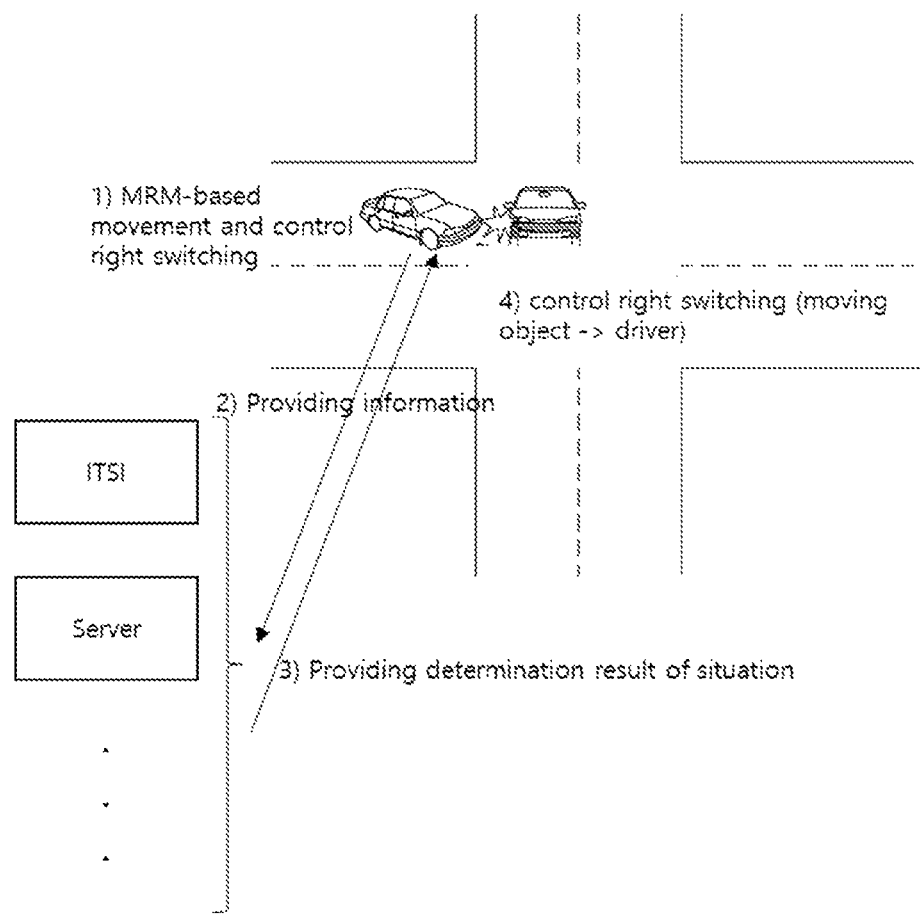
FIGS. 4A and 4B are views illustrating a process after an accident occurs to an autonomous vehicle according to another embodiment of the present disclosure.
Figure 4B:
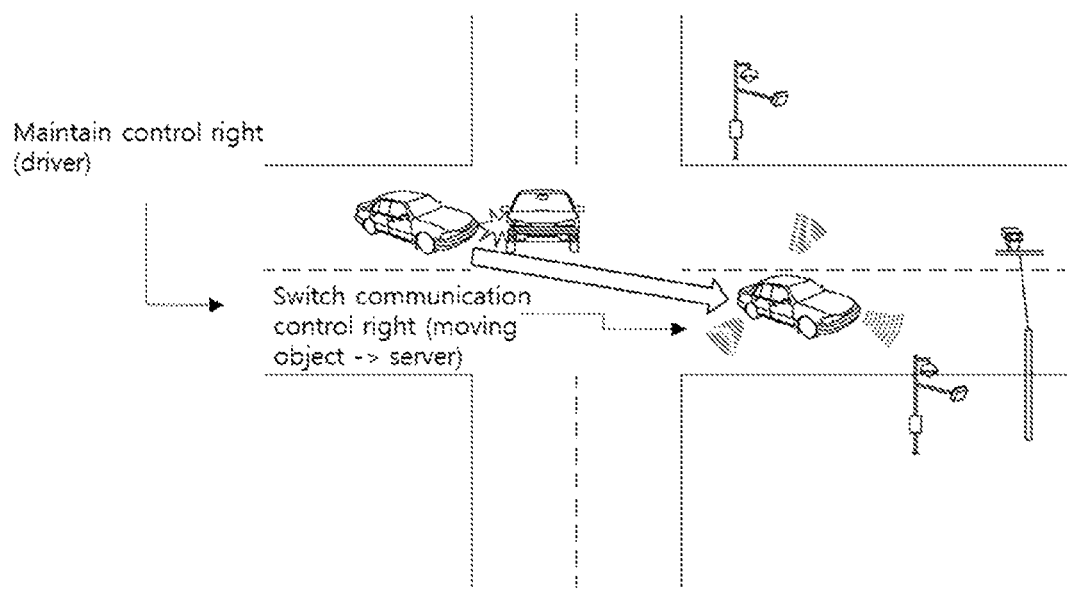

FIGS. 4A and 4B are views illustrating a process after an accident occurs to an autonomous vehicle according to another embodiment of the present disclosure.

Referring to FIG. 4A and FIG. 4B, it is possible to consider a case where a collision or an accident occurs to an autonomous vehicle. In FIG. 4A, a collision may occur to an autonomous vehicle. The autonomous vehicle may switch a control right based on the above-described MRM function after moving a certain distance. That is, the autonomous vehicle may not allow the control right for the driver. When the control right is not allowed for the driver in the autonomous vehicle, the autonomous vehicle may communicate with at least one of an ITSI, a user terminal, or a server. The autonomous vehicle may transmit information obtained through radar, a camera and a sensor to at least one of an ITSI, a user terminal, or a server and thus implement a follow-up measure. The autonomous vehicle may transmit sensing information to the server, and the server may determine an accident situation by comparing the sensing information with previously stored information and determine a necessary measure based on the determined accident situation. Next, the server may provide information on the determined measure to the autonomous vehicle via the ITSI, the user terminal, which are described above, or direct communication. Next, the autonomous vehicle may perform a necessary measure based on the received information and, when the measure is completed, hand the control right back to the driver. That is, for an accident that occurs when a moving object runs based on autonomous driving, a control right may be managed based on an external device or a server, thereby preventing escape.

Referring to FIG. 4B as described above, when an accident occurs while a moving object performs autonomous driving, a control right may not be changed in the moving object. The control right may be retained by the driver in the moving object by considering a secondary accident or the system inability of the moving object. However, a function of preventing the driver from fleeing after the accident may be required. In addition, it is necessary to provide information on the accident occurring to the moving object to a neighbor moving object or a server. With this in consideration, not the control right of a driver of a moving object but only the control right of communication of the moving object may be changed. That is, when an accident occurs while a moving object runs based on autonomous driving, the communication function of the moving object may be terminated or controlled by the driver. The autonomous vehicle may periodically transmit a collision notification signal as collision-related information to neighbor moving objects at a predetermined time interval. In addition, when receiving the collision notification signal, the neighbor moving objects may provide the collision notification signal or information contained therein (e.g., information on an accident situation) to an ITSI, a user terminal, or a server. In response to this, the ITSI, the user terminal, or the server may identify the moving object to which the accident occurred, determine whether or not the identified moving object moves, whether or not the moving object escapes, and a movement route, and perform a corresponding operation, for example, change of communication control, transmission of an escape warning message.

In addition, a moving object may provide information on an accident situation by communicating with an ITSI, a user terminal, or a server. That is, a moving object may make a communication control right change for providing information for the handling of an accident situation but may retain a control right related to moment with consideration of a further accident.

Figure 5A:
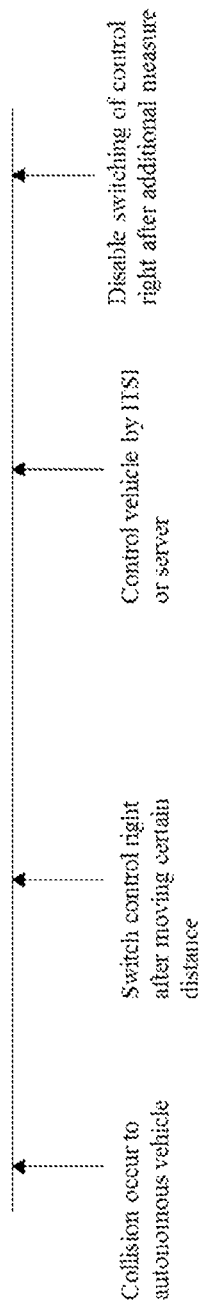
FIGS. 5A and 5B are views showing a method of switching control right when an accident occurs to an autonomous vehicle according to an embodiment of the present disclosure.
Figure 5B:
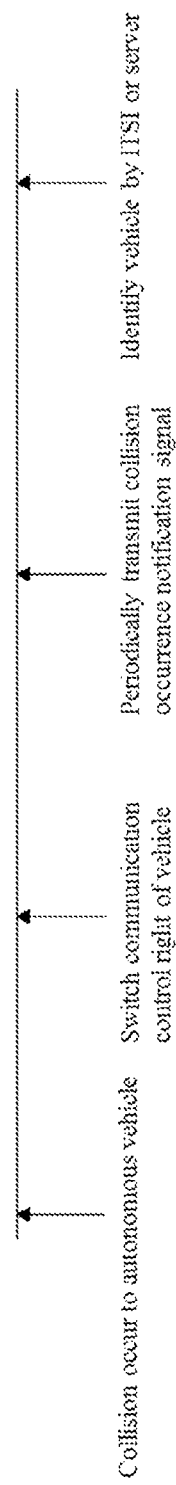

FIGS. 5A and 5B are views showing a method of switching control right when an accident occurs to an autonomous vehicle according to an embodiment of the present disclosure.

However, it is possible to consider a case in which an escape occurs by a driver of the moving object in the above-described situation. That is, after an accident occurs to a moving object in an autonomous driving mode, a control right of the moving object may be switched to manual and the moving object may flee under the control of a driver. As described above, a communication control right of the moving object may be switched. Accordingly, the driver may not be able to close or control arbitrarily the communication function of the moving object. Referring to FIGS. 5A and 5B, the moving object may periodically transmit collision occurrence information to at least one of a neighbor moving object, an ITSI, and a server at a predetermined time interval. In addition, the moving object may transmit information obtained through at least any one of radar, a camera and a sensor to at least any one of a neighbor moving object, an ITSI, a user terminal, and a server. In addition, the moving object may periodically transmit its position information to at least any one of a neighbor moving object, an ITSI, a user terminal, and a server at a predetermined time interval. Accordingly, even when the moving object switches a control right and escapes after an accident, escape information of the moving object may be identified based on the neighbor moving object or the ITSI and thus the escape of the moving object may be prevented.

Figure 6:
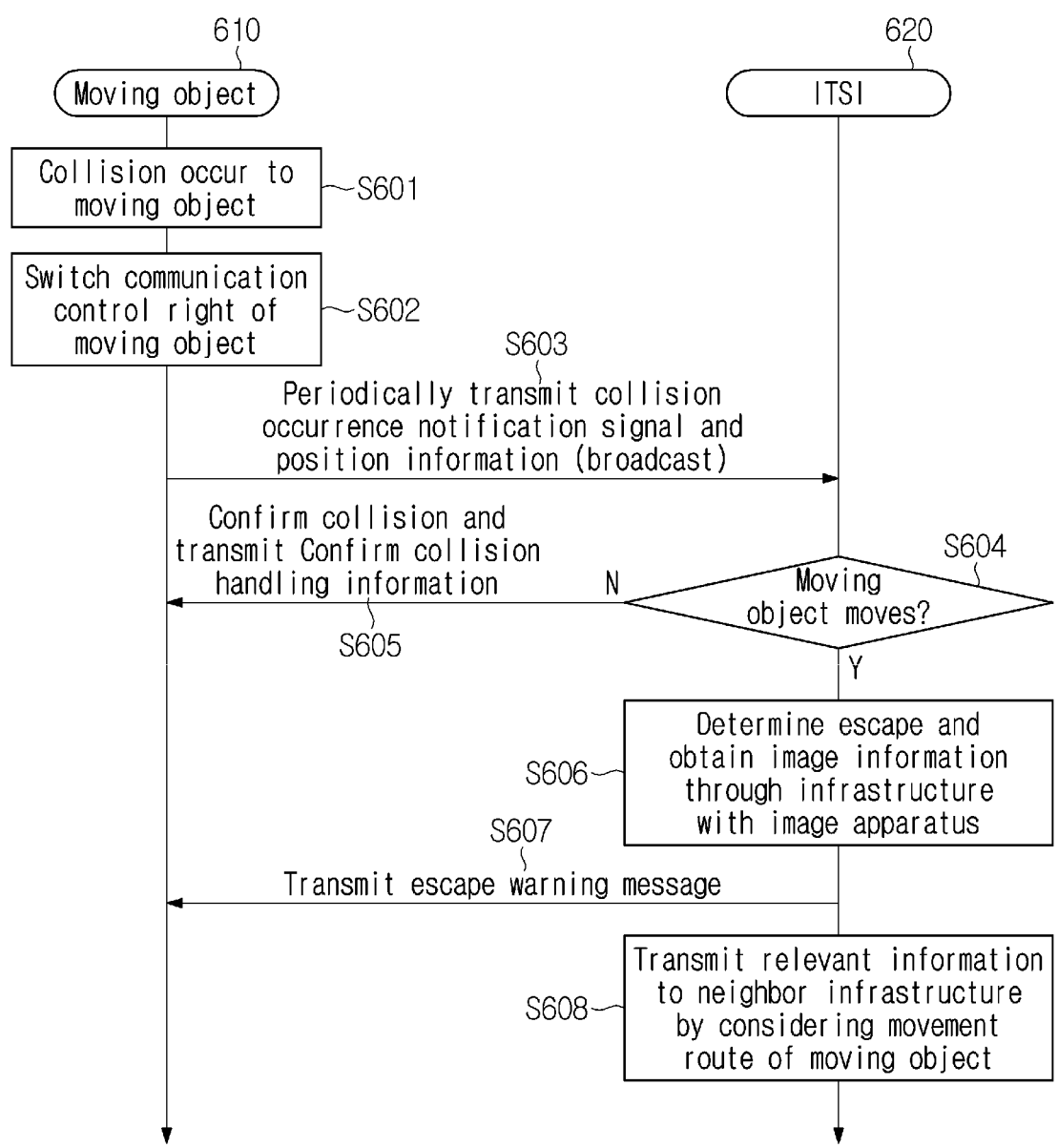
FIG. 6 is an exemplary view showing a procedure of a method for preventing an autonomous vehicle from escaping when an accident occurs to the autonomous vehicle according to an embodiment of the present disclosure.

FIG. 6 is an exemplary view showing a procedure of a method for preventing an autonomous vehicle from escaping when an accident occurs to the autonomous vehicle according to an embodiment of the present disclosure.

As a more specific example, referring to FIG. 6, a collision may occur to a moving object 610 in step S601. A communication control right of the moving object 610 may be switched in the moving object 610 in step S602. That is, a driver may not be able to close or control arbitrarily the communication function of the moving object 610. On the other hand, the driver may have authority to drive and move the moving object 610, as described above.

When a collision occurs to the moving object 610, the moving object 610 may move a certain distance and then stop based on the above-described MRM function. As the MRM function is a function that is set in the moving object 610 based on autonomous driving, the moving object 610 may move a certain distance without the driver's control. After the moving object 610 moves a certain distance, a control right of the moving object 610 may be given to the driver. However, even when the control right is given to the driver after the moving object 610 moves a certain distance based on the MRM function, a communication control right of the moving object 610 may not be given to the driver in order to prevent an escape. That is, the driver may not be able to arbitrarily close the communication function of the moving object or change settings. The moving object 610 may switch the communication control right and then periodically transmit a collision occurrence notification signal at a predetermined time interval in step S603. The collision occurrence notification signal may be delivered based on a broadcast method. Thus, another moving object or an ITSI around the moving object 610 may receive information on the accident. The moving object 610 may transmit collision confirmation information to an ITSI 620 based on unicast. Next, the ITSI 620 may confirm collision-related information and determine whether or not the moving object 610 moves. The moving object 610 may have stopped after moving a minimum distance based on MRM. In addition, the moving object 610 may have been moved by a driver to an area in which a secondary accident may be prevented. Next, the ITSI 620 may determine whether or not the moving object 610 further moves in step S604. The moving object 610 may periodically transmit its position information along with collision occurrence information at a predetermined time interval. Herein, the ITSI (or server) 620 may determine whether or not the moving object 610 is moving. Herein, when the moving object 610 does not move, the ITSI 620 may deliver accident handling information, which is obtained by itself or received from a server, to the moving object 610 in step S605. Herein, the moving object 610 may perform a follow-up measure based on the received information, thereby performing accident handling.

Moreover, when the accident is completely handled, the moving object 610 may be moved by a tow truck. In this regard, the moving object 610 may sense a situation of being moved by the tow truck based on tire pressures sensed by a tire pressure monitoring system (TPMS). When the moving object 610 is moved by the tow truck, two front or rear tires may not touch the ground while the remaining two tires touch the ground while the moving object 610 is being towed. Accordingly, a pressure of the pair of tires touching the ground may be different from a pressure of the other pair of tires touching the ground. Thus, the moving object 610 may determine a situation of being moved by a tow truck by considering the pressure values of one pair of front or rear tires and the other pair of tires. The moving object 610 may be moved with its entire body loaded on a tow truck. When the moving object 610 is moved by being loaded on a tow truck, the position information of the moving object 610 may change while the moving object 610 is not turned on, the moving object 610 may determine the situation of being moved by the tow truck based on the position information periodically identified and the status of being turned on/off.

On the other hand, it is possible to consider a case where the position of the moving object 610 constantly changes. That is, it is possible to consider a case where the moving object 610 moves. When the moving object 610 moves, the ITSI (or server) 620 may identify whether or not the moving object 610 is an escaping moving object. The ITSI (or server) 602 may obtain information on the moving object 610 from another ITSI around the moving object 610 in step S606. The ITSI (or server) 620 may obtain image information through an infrastructure equipped with an image apparatus. Next, when it is confirmed that the moving object 610 escapes, the ITSI (or server) 602 may transmit an escape warning message to the moving object 610 in step S607. In addition, the ITSI (or server) 620 may receive information on the moving object 610 from an infrastructure around the moving object 610 by considering a movement route (or escape route) of the moving object 610 and perform a chase for the moving object 610 based on the information in step S608.

In addition, when the moving object 610 does not escape but receives accident handling information from the ITSI (or server) 620, the moving object 610 may terminate a collision situation based on the received information. When the collision situation ends and handling is completed, the moving object 610 may transmit a collision handling completion message to the ITSI 620. Next, the moving object 610 may receive a confirmation message for the collision handling completion message. When the message is received, a communication control right may be given to a user of the moving object 610. That is, the user of the moving object 610 may be able to arbitrarily end the communication function and to control the communication function as the user likes.

Figure 7:
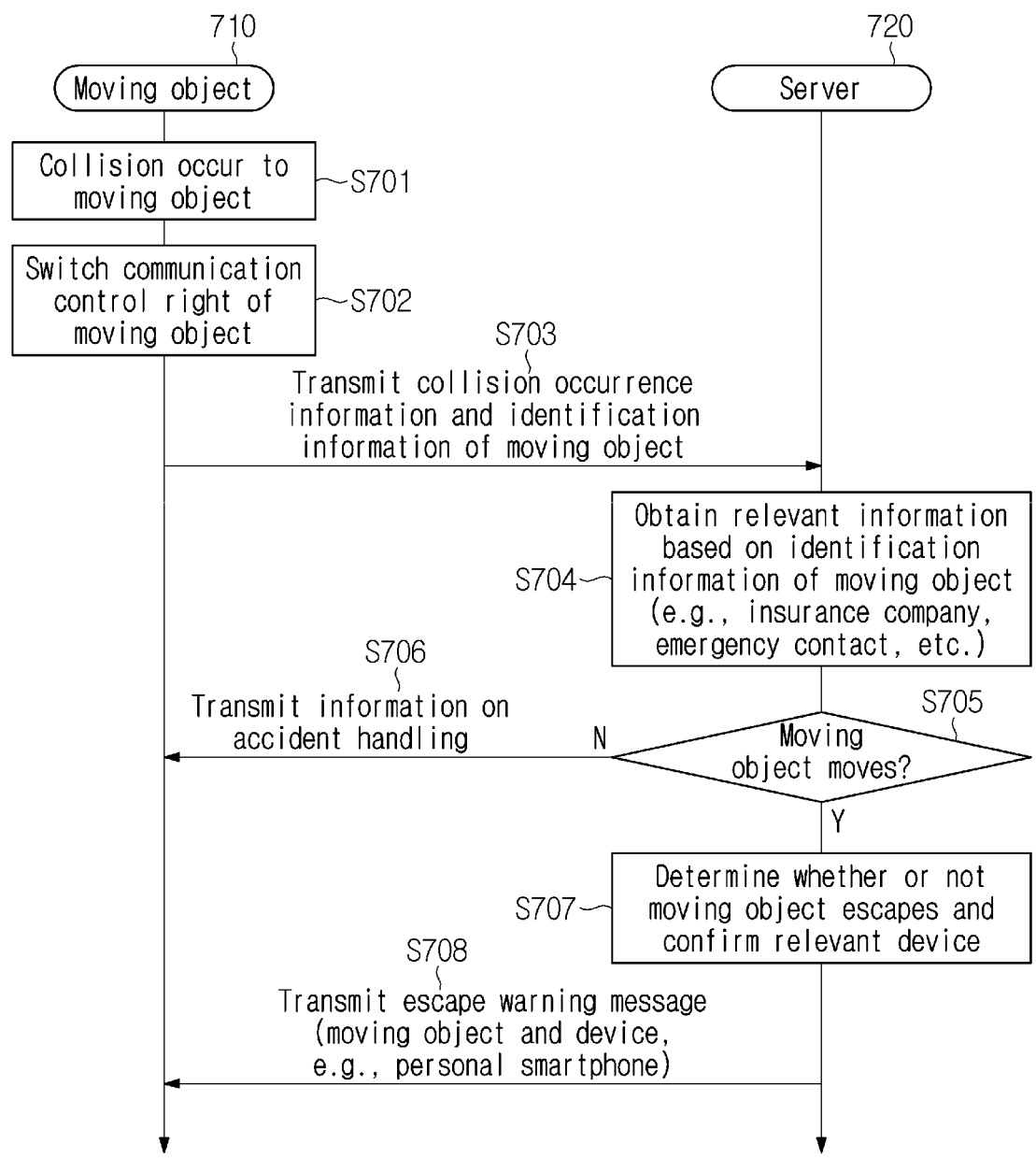
FIG. 7 is another exemplary view showing a procedure of a method for preventing an autonomous vehicle from escaping when an accident occurs to the autonomous vehicle according to an embodiment of the present disclosure.

FIG. 7 is another exemplary view showing a procedure of a method for preventing an autonomous vehicle from escaping when an accident occurs to the autonomous vehicle according to an embodiment of the present disclosure.

Referring to FIG. 7, a collision may occur to a moving object 710 in step S701. A communication control right of the moving object 710 may be switched in the moving object 710 in step S702. That is, a driver may not be able to close or control arbitrarily the communication function of the moving object 710. On the other hand, the driver may have authority to drive and move the moving object 710, as described above. The moving object 710 may switch the communication control right and then periodically transmit a collision occurrence notification signal at a predetermined time interval in step S703. The collision occurrence notification signal may be delivered based on a broadcast method. Thus, another moving object or an ITSI around the moving object 710 may receive information on the accident. The moving object 710 may transmit collision confirmation information to an ITSI 720 based on unicast. The moving object 710 may transmit identification information of the moving object along with collision occurrence information to the ITSI (or server) 720. The identification information as an identifier that is uniquely assigned to the moving object 710 may be registered in a server or infrastructure. After receiving the collision occurrence information and the identification information of the moving object, the ITSI (or server) 720 may obtain further information on the moving object based on the received identification information in step S704. Herein the further information may be information on an insurance company or emergency contact related to the moving object. When the identification information of the moving object 710 is registered in the ITSI (or server) 720, the further information on the moving object 710 may be information that is already stored by a user of the moving object 710. In addition, the further information on the moving object 710 may be information for a follow-up measure associated to an accident and is not limited to the above-described embodiment.

Next, the ITSI 720 may confirm collision-related information and determine whether or not the moving object 710 moves in step S705. The moving object 710 may have stopped after moving a minimum distance based on MRM. In addition, the moving object 710 may have been moved by a driver to an area in which a secondary accident may be prevented. Next, the ITSI 720 may check whether or not the moving object 710 moves further. The moving object 710 may periodically transmit its position information along with collision occurrence information at a predetermined time interval. The ITSI (or server) 720 may determine whether or not the moving object 710 is moving. When the moving object 710 does not move, the ITSI 720 may deliver accident handling information, which is obtained by itself or received from a server, to the moving object 710 in step S706. The moving object 710 may perform a follow-up measure based on the received information, thereby performing accident handling.

On the other hand, it is possible to consider a case where the position of the moving object 710 constantly changes. That is, it is possible to consider a case where the moving object 710 moves in step S707. For example, when the moving object 710 moves, the ITSI (or server) 720 may check whether or not the moving object 710 is an escaping moving object. The ITSI (or server) 720 may obtain information on the moving object 710 from another ITSI around the moving object 710. The ITSI (or server) 720 may obtain image information through an infrastructure image with an image apparatus. In addition, the ITSI (or server) 720 may check whether or not the moving object 710 escapes. Whether or not the moving object 710 escapes may be determined based on a travel distance of the moving object 710. When the moving object 710 moves further than a predetermined distance (e.g., 10 m) after the occurrence of an accident is sensed, the ITSI (or server) 720 may determine that the moving object 710 escapes. Next, when it is confirmed that the moving object 710 escapes, the ITSI (or server) 720 may transmit an escape warning message to the moving object 710. In addition, the ITSI (or server) 720 may receive information on the moving object 710 from an infrastructure around the moving object 710 by considering a movement route (or escape route) of the moving object 710 and perform a chase for the moving object 710 based on the information. After determining whether or not the moving object 710 escapes, the ITSI (or server) 720 may identify a device associated with the moving object 710. The device associated with the moving object 710 may be a personal smart device of a driver of the moving object 710. In addition, the device associated with the moving object 710 may be a device that is already registered by the moving object 710. The ITSI (or server) 720 may transmit the escape warning message not only to the moving object 710 but also to a device associated with the moving object 710 in step S708. That is, the ITSI (or server) 720 may provide escape information also to an owner of the moving object 710 by transmitting a warning message and thus may prevent the moving object 710 from escaping.

Figure 8:
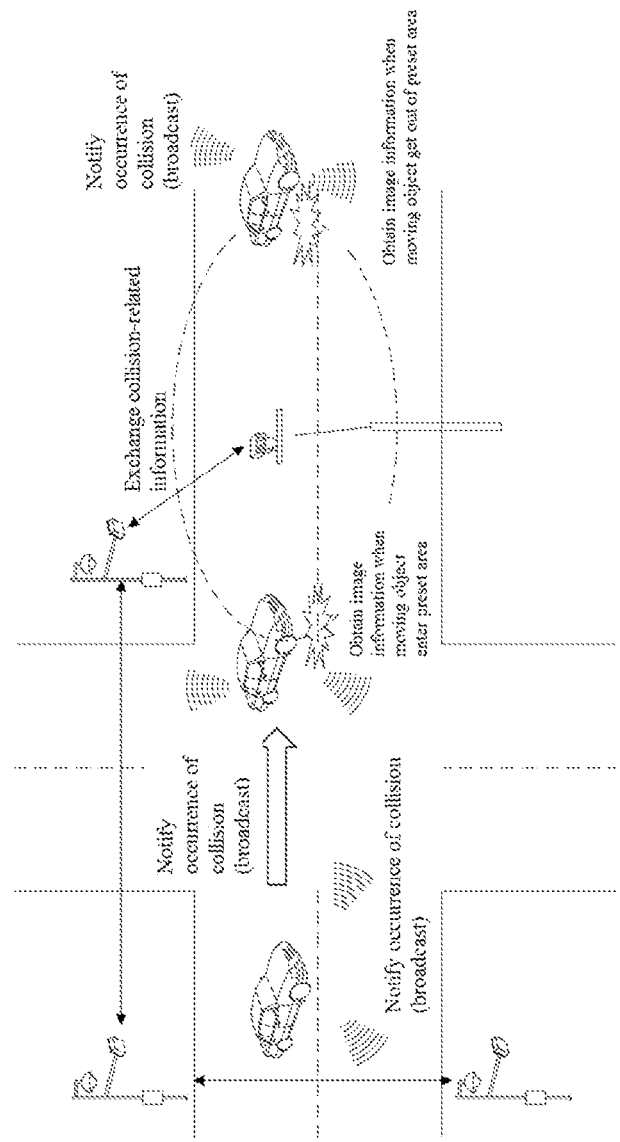
FIG. 8 is a view showing a method of identifying an escaping vehicle when an accident occurs to an autonomous vehicle according to an embodiment of the present disclosure.

FIG. 8 is a view showing a method of identifying an escaping vehicle when an accident occurs to an autonomous vehicle according to an embodiment of the present disclosure.

Referring to FIG. 8, it is possible to consider a case where a moving object escapes based on what is described above. When a communication control right of the moving object is switched, a driver may arbitrarily close the communication function of the moving object or change its setting. Further, when a collision occurs to the moving object, the moving object may periodically transmit a broadcast message about the occurrence of collision at a predetermined time interval. Thus, a neighbor moving object and an infrastructure may confirm the accident information of the moving object. When the moving object escapes as described above, the moving object may constantly transmit a broadcast message. Other infrastructures located on an escape route of the moving object may receive collision-related information from the moving object and confirm whether or not the moving object is an escaping vehicle based on the received information and the movement of the moving object. In addition, the moving object may transmit its own position information along with collision occurrence information through a broadcast message, as described above. A neighbor moving object and other infrastructures around the moving object may determine whether or not the moving object is moving (or escaping) based on the position information of the moving object and may obtain relevant information based on the movement of the moving object. After receiving collision occurrence information and position information of a moving object from the moving object, an ITSI may determine that the moving object is an escaping vehicle based on the movement of the moving object, if the moving object is outside of a preset region. Herein, an ITSI or a neighbor moving object may obtain information on a moving object through radar, a camera and other sensors and transmit the information to a server or another infrastructure. That is, as a moving object notifies the occurrence of a collision by periodically broadcasting collision occurrence notification information and its own position information, whether or not the moving object escapes may be monitored by a neighbor moving object and an ITSI at a predetermined time interval.

Figure 9:
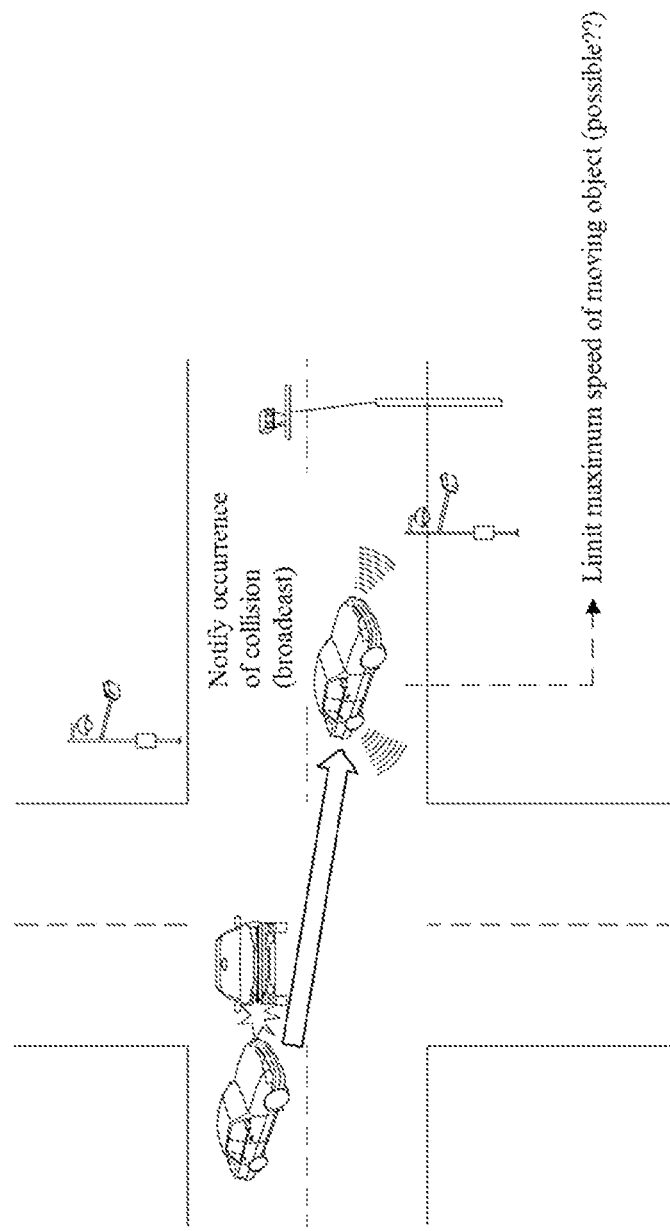
FIG. 9 is a view showing a method of controlling an escaping vehicle when an accident occurs to an autonomous vehicle according to an embodiment of the present disclosure.

FIG. 9 is a view showing a method of controlling an escaping vehicle when an accident occurs to an autonomous vehicle according to an embodiment of the present disclosure.

As described above, when an accident occurs to an autonomous vehicle, a communication control right of the vehicle may be changed. The maximum permissible speed of the moving object may be limited. When an accident occurs to an autonomous vehicle, since the accident may have to be handled based on a driver's control, not all control rights may be switched but only a control right for communication may be switched. However, as described above, it is possible to consider a case where a driver switches a control right of a moving object and then escapes. In the case of an escaping moving object, since the moving object escapes at high speed and there is a high risk of colliding with another moving object, it may be exposed to a further accident. In consideration of the above description, limitations may be set on maximum permissible speed as well as communication control right in a moving object. When an accident occurring to a moving object is completely handled and an accident situation is terminated by an ITSI (or server), the above-described communication control right and the authority for maximum permissible speed may be recovered and thus the moving object may be controlled by a driver. That is, the above-described limitations may be set as an extension of MRM in consideration of an accident and escape occurring to a moving object but is not limited to the above-described embodiment.

Figure 10:
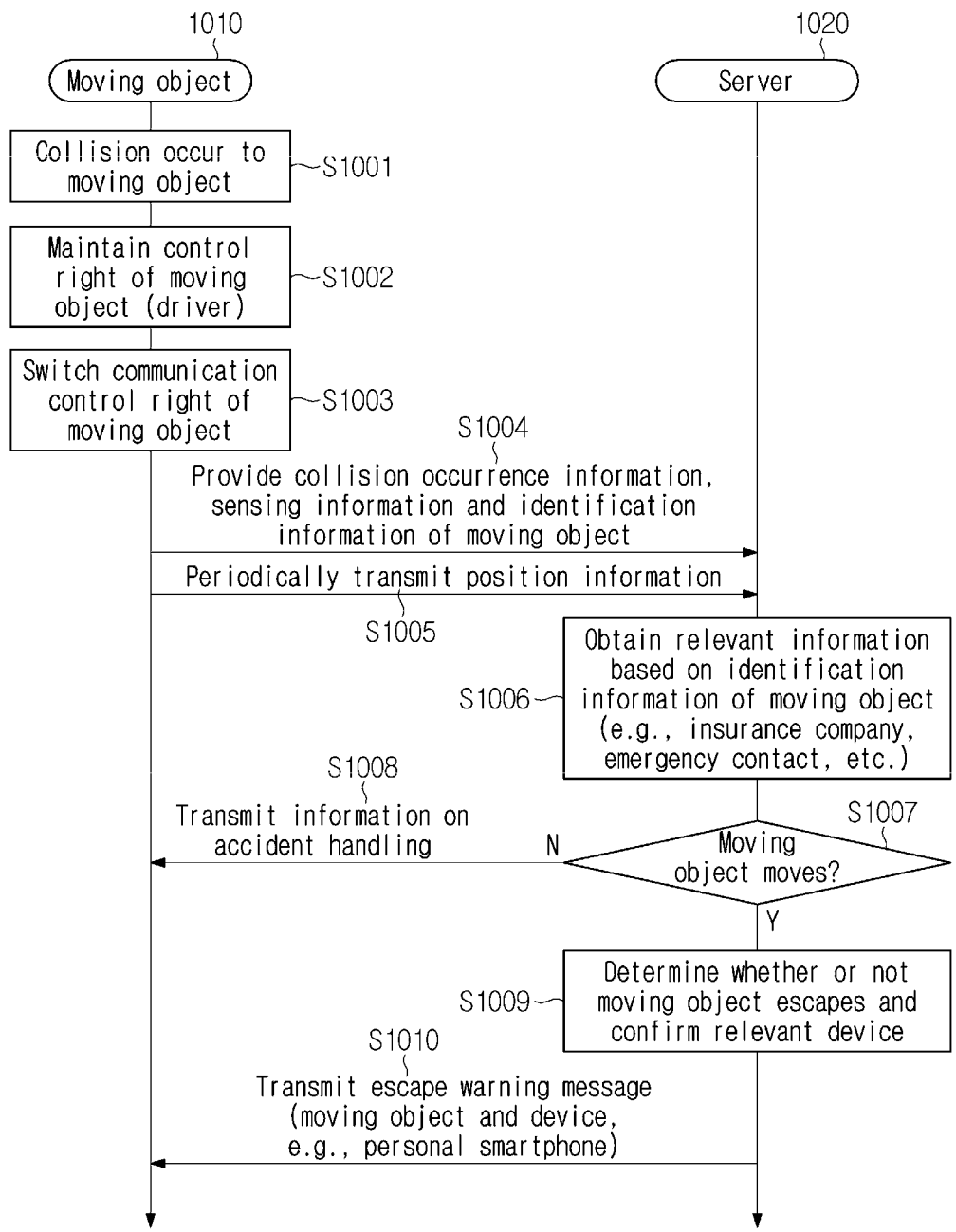
FIG. 10 is yet another exemplary view showing a procedure of a method for preventing an autonomous vehicle from escaping when an accident occurs to the autonomous vehicle according to an embodiment of the present disclosure.

FIG. 10 is yet another exemplary view showing a procedure of a method for preventing an autonomous vehicle from escaping when an accident occurs to the autonomous vehicle according to an embodiment of the present disclosure.

Referring to FIG. 10, when a collision occurs to a moving object 1010 in step S1001, not only a communication control right of the moving object but also a control right for an image information acquisition apparatus may be switched. Even when an accident occurs to the moving object 1010, a control right for the moving object itself may not be switched so that the accident may be handled based on a driver's control in step S1002. However, as the accident occurs to the moving object 1010, information may have to be obtained in order to understand the accident situation and to handle the accident. Accordingly, in the moving object 1010, not only the communication control right but also a control right of apparatuses like radar, camera and other sensors for acquiring external information may be switched in step S1003. Thus, when an accident occurs to the moving object 1010, the moving object 1010 may transmit collision occurrence information, external information sensed through the moving object 1010 and identification information of the moving object 1010 to an ITSI (or server) 1020 in step S1004. Herein, the ITSI (or server) 1020 may perform accident handling by using the obtained information in step S1006. The ITSI (or server) 1020 may determine an accident situation based on the obtained information, determine a necessary measure for the accident situation and provide the measure to the moving object 1010.

In addition, the moving object 1010 may periodically transmit its position information along with collision occurrence information at a predetermined time interval in step S1005. Herein, the ITSI (or server) 1020 may determine whether or not the moving object 1010 is moving in step S1007. Herein, when the moving object 1010 does not move, the ITSI 1020 may deliver accident handling information, which is obtained by itself or received from a server, to the moving object 1010 in step S1008. The moving object 1010 may perform a follow-up measure based on the received information, thereby performing accident handling.

On the other hand, it is possible to consider a case where the position of the moving object 1010 constantly changes. That is, it is possible to consider a case where the moving object 1010 moves. When the moving object 1010 moves, the ITSI (or server) 1020 may confirm whether or not the moving object 1010 is an escaping moving object in step S1009. The ITSI (or server) 1020 may obtain information on the moving object 1010 from another ITSI around the moving object 1010. The ITSI (or server) 1020 may obtain image information through an infrastructure equipped with an image apparatus. Next, when it is confirmed that the moving object 1010 escapes, the ITSI (or server) 1020 may transmit an escape warning message to the moving object 1010 in step S1010. The ITSI (or server) 1020 may deliver a command for transmitting the escape warning message and external sensing information to the moving object 1010. That is, the ITSI (or server) 1020 may obtain information that is obtained using an apparatus installed in the moving object and thus may determine a position of the moving object and the surroundings. When a control right for apparatuses for obtaining external information is switched in the moving object 1010, information obtained in the moving object 1010 may be transmitted to the ITSI (or server) 1020, and a chase for the moving object 1010 may be performed based on the information.

Although, in various embodiments of the present disclosure, an ITSI or server is illustrated to determine whether or not a moving object escapes, the present disclosure is not limited thereto, and an entity for determining whether or not a moving object escapes may change variously. For example, it is possible for a moving object to determine whether or not it is fleeing.

Figure 11A:
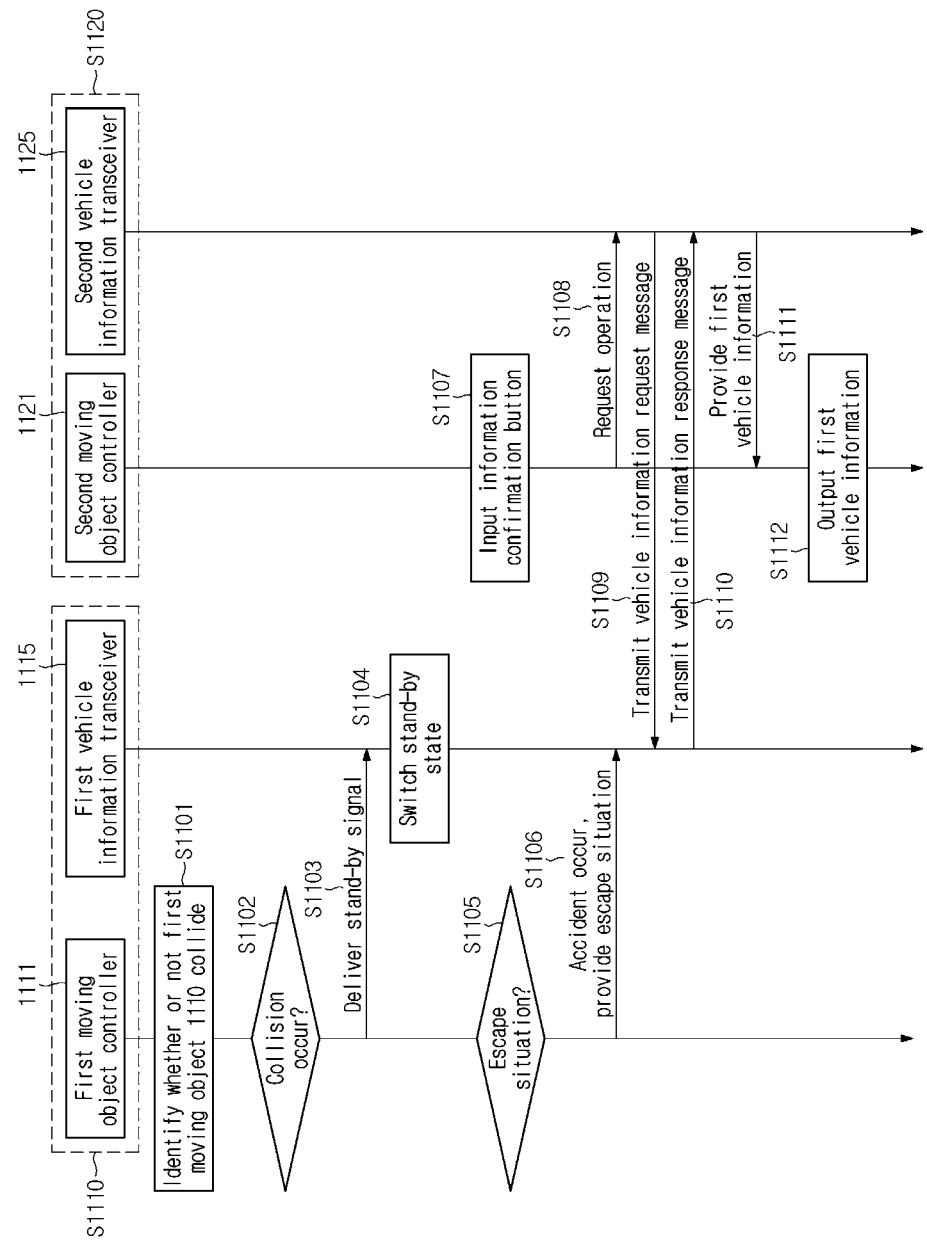
FIGS. 11A, 11B and 11C illustrate an operation of verifying vehicle information of an autonomous vehicle when an accident occurs to an autonomous vehicle according to an embodiment of the present disclosure.
Figure 11B:
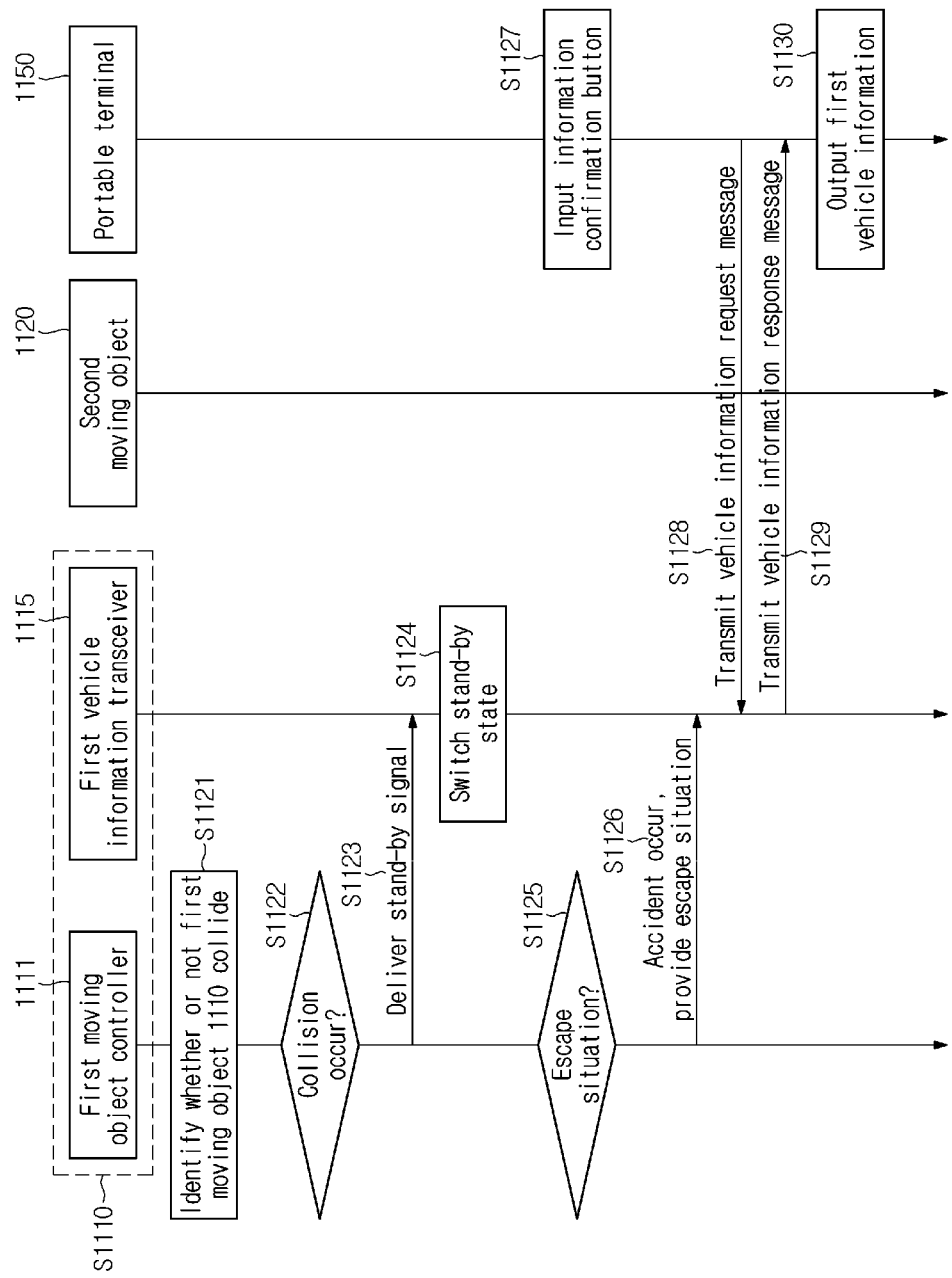
Figure 11C:
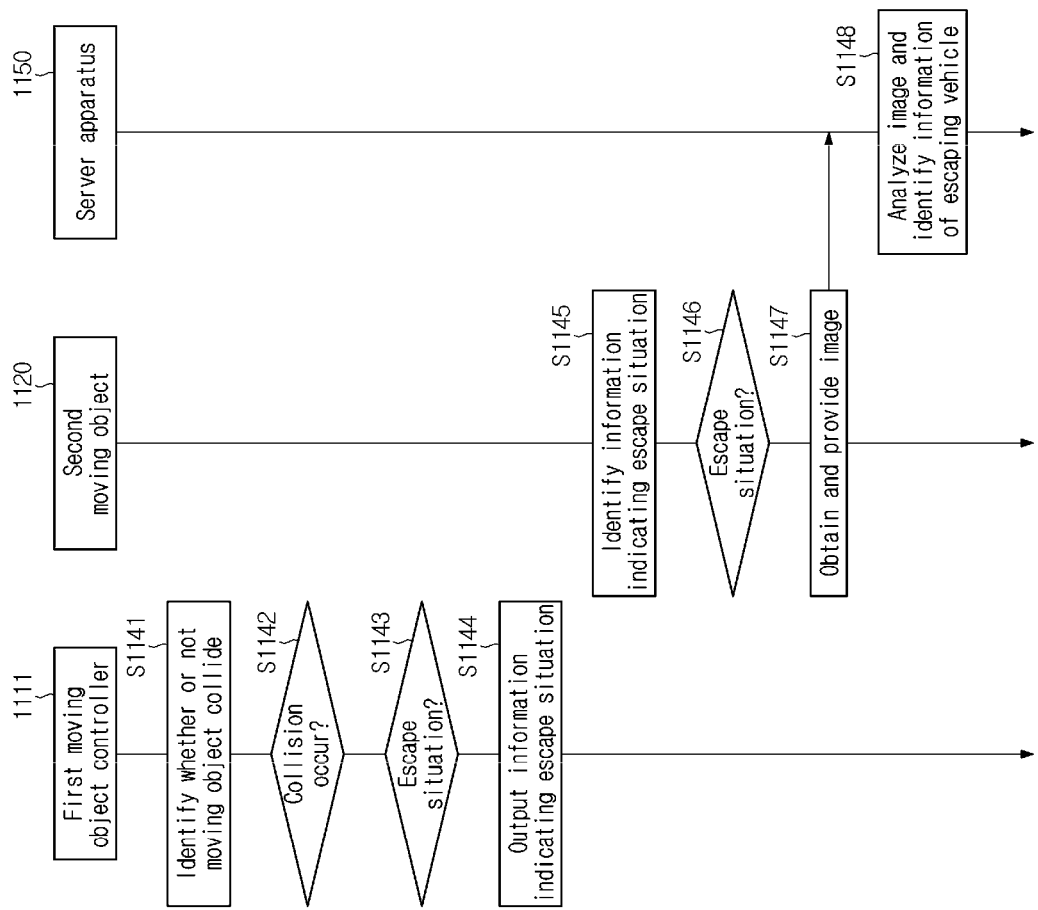

FIGS. 11A, 11B and 11C illustrate an operation of verifying vehicle information of an autonomous vehicle when an accident occurs to an autonomous vehicle according to an embodiment of the present disclosure.

FIGS. 11A and 11B illustrate an operation of determining whether or not a first moving object 1110 to which an accident occurs escapes by using the first moving object 1110 and a second moving object 1120 located adjacent to the first moving object 1110, to which the accident occurs, and of providing information of the first moving object 1110.

Referring to FIG. 11A, the first moving object 1110 and the second moving object 1120 may include moving object controllers 1111 and 1121 and vehicle information transceivers 1115 and 1125 respectively. The first moving object controller 1111 installed in the first moving object 1110 may identify whether or not a vehicle collides or an impact amount by using a sensor (e.g., acceleration sensor) mounted in the vehicle and may determine whether or not an accident occurs based on the identified result in step S1101. The first moving object controller 1111 may basically identify the amount of an impact on the first moving object 1110 through an acceleration sensor and may be configured to deliver a control signal to an air control unit (ACU) and to operate an airbag, when the impact amount exceeds a predetermined threshold. The first moving object controller 1111 may identify whether or not a vehicle collides based on an impact amount that is sensed during processing for the above-described airbag operation. For example, the first moving object controller 111 may determine that a collision of vehicle occurs, when an identified impact amount exceeds a predetermined threshold (e.g., 50 G). As another example, the first moving object controller 1111 may identify whether or not a collision occurs using an identified impact amount and a difference value of velocity. Specifically, the first moving object controller 1111 may identify a first velocity before an identified impact amount exceeds a predetermined threshold (e.g., 50 G) and a second velocity after an impact amount exceeds a predetermined threshold (e.g., 50 G), and, when a difference value between the first velocity and the second velocity exceeds a predetermined threshold of velocity difference (e.g., 30 Km/H), may determine that a collision of vehicle occurs. Herein, when the collision of vehicle occurs in step S1102, the first moving object controller 1111 may deliver a stand-by signal to a first vehicle information transceiver 1115 in step S1103 and the first vehicle information transceiver 1115 switch stand-by state in step S1104.

The first moving object controller 1111 may identify a travel distance of the first moving object 1110 after an accident occurs. In addition, the first moving object controller 1111 may identify whether or not a travel distance of the first moving object 1110 exceeds a predetermined threshold of distance (e.g., 10 m) and may determine that the first moving object escapes in step S1105, when the travel distance exceeds the predetermined threshold of distance (e.g., 10 m). Herein, the first moving object controller 1111 may provide information indicating the occurrence of an accident or an escape situation of the first moving object 1110 to the first vehicle information transceiver 1115 in step S1106.

The second moving object 1120 may be provided with an environment in which it is possible to request the confirmation of information of a neighbor moving object (e.g., the first moving object 1110). For example, the second moving object 1120 may be provided with an information confirmation button that may request the confirmation of information of a neighbor moving object (e.g., the first moving object 1110). The second moving object controller 1121 may identify whether or not the information confirmation button is input and may request an operation to the second vehicle information transceiver 1125 in step S1108, when the information confirmation button is input in step S1107. As another example, the second moving object 1120 may be connected with a server apparatus for managing an escape situation or state of a moving object through an ITSI or a communication network. The second moving object controller 1121 may identify whether or not a command or message requesting the confirmation of information on a neighbor moving object (e.g., the first moving object 1110) from a server apparatus for managing an escape situation or state of a moving object and may request an operation to the second vehicle information transceiver. The first vehicle information transceiver 1115 and the second vehicle information transceiver 1125 may support short-range wireless communication (e.g., Bluetooth, Wifi, WLAN, etc.), vehicle-to-everything (V2X) communication, etc., and request or transmit necessary information via short-range wireless communication and V2X communication. Specifically, the second vehicle information transceiver 1125 may transmit a vehicle information request message requesting vehicle information to the first vehicle information transceiver 1115 in step S1109. Herein, the vehicle information request information may include information for requesting the confirmation of the occurrence of a collision or information for requesting the confirmation of an escape situation. In response to this, the first vehicle information transceiver 1115 that is operated in a stand-by status may confirm a vehicle information request message, identify whether or not a collision of the first moving object 1110 occurs or an escape situation, and in response to the occurrence of a collision or the escape situation, provide a response message including the vehicle information of the first moving object 1110 (i.e., first vehicle information) to the second vehicle information transceiver 1125 in step S1110. In a situation other than the occurrence of a collision or an escape situation, the first vehicle information transceiver 1115 may provide a rejection message including information indicating that the situation is not the occurrence of a collision or an escape situation to the second vehicle information transceiver 1125. An embodiment of the present disclosure illustrates that short-range wireless communication (e.g., Bluetooth, Wifi, WLAN, etc.) and V2X communication are used to transmit and receive data between the first vehicle information transceiver 1115 and the second vehicle information transceiver 1125. However, the present disclosure is not limited to the embodiment, and data transmission and reception between the first vehicle information transceiver 1115 and the second vehicle information transceiver 1125 are sufficient. Based on this, a method of transmitting and receiving data between the first vehicle information transceiver 1115 and the second vehicle information transceiver 1125 may be variously modified by those skilled in the art.

The second vehicle information transceiver 1125 may provide first vehicle information included in a received response message to the second moving object controller 1121 in step S1111, and the second moving object controller 1121 may output the first vehicle information through a display installed in the second moving object 1120 in step S1112.

Furthermore, the second vehicle information transceiver 1125 may provide information on a first vehicle, the occurrence of a collision and an escape situation to an ITSI or a server.

Although, in an embodiment of the present disclosure, it is illustrated that the second vehicle information transceiver 1125 transmits a vehicle information request message and the first vehicle information transceiver 1115 transmits a response message, the present disclosure is not limited to the embodiment. It is sufficient as long as the first vehicle information transceiver 1115 and the second vehicle information transceiver 1125 may exchange information on whether or not a collision occurs, an escape situation and first vehicle information. Based on this, the first vehicle information transceiver 1115 may be configured to periodically broadcast a message including information on whether or not a collision occurs, an escape situation and first vehicle information, and the second vehicle information transceiver 1125 may be configured to receive the broadcast message. Herein, the message that is broadcast by the first vehicle information transceiver 1115 and includes information on whether or not a collision occurs, an escape situation and first vehicle information may be delivered directly to the second vehicle information transceiver 1125. The message that is broadcast by the first vehicle information transceiver 1115 and includes information on whether or not a collision occurs, an escape situation and first vehicle information may be delivered to a server apparatus for managing an escape situation or state of a moving object via an ITSI or a communication network and may also be delivered to the second vehicle information transceiver 1125 via the server apparatus.

In the embodiment described above, it is illustrated that the second moving object 1120 is provided with an information confirmation button as an environment where information confirmation for a neighbor moving object (e.g., the first moving object 1110) may be requested. However, the embodiment does not limit the present disclosure but may be modified variously. For example, it is possible to confirm information on the first moving object 1110 by using a portable terminal (e.g., a mobile communication terminal, a smartphone, etc.) existing in the second moving object 1120.

Specifically, referring to FIG. 11B, the first moving object controller 1111 installed in the first moving object 1110 may identify whether or not a vehicle collides or an impact amount by using a sensor (e.g., acceleration sensor) mounted in the vehicle and may determine whether or not an accident occurs based on the identified result in step S1121. The first moving object controller 1111 may basically identify the amount of an impact on the first moving object 1110 through an acceleration sensor and may be configured to deliver a control signal to an air control unit (ACU) and to operate an airbag, when the impact amount exceeds a predetermined threshold. The first moving object controller 1111 may identify whether or not a vehicle collides based on an impact amount that is sensed during processing for the above-described airbag operation. For example, the first moving object controller 111 may determine that a collision of vehicle occurs, when an identified impact amount exceeds a predetermined threshold (e.g., 50 G). As another example, the first moving object controller 1111 may identify whether or not a collision occurs using an identified impact amount and a difference value of velocity. Specifically, the first moving object controller 1111 may identify a first velocity before an identified impact amount exceeds a predetermined threshold (e.g., 50 G) and a second velocity after an impact amount exceeds a predetermined threshold (e.g., 50 G), and, when a difference value between the first velocity and the second velocity exceeds a predetermined threshold of velocity difference (e.g., 30 Km/H), may determine that a collision of vehicle occurs. The first moving object controller 1111 may identify a travel distance of the first moving object 1110 after an accident occurs. In addition, the first moving object controller 1111 may identify whether or not a travel distance of the first moving object 1110 exceeds a predetermined threshold of distance (e.g., 10 m) and may determine that the first moving object escapes, when the travel distance exceeds the predetermined threshold of distance (e.g., 10 m). Thus, when the collision of vehicle occurs in step S1122, the first moving object controller 1111 may deliver a stand-by signal to the first vehicle information transceiver 1115 in step S1123 and the first vehicle information transceiver 1115 switch stand-by state in step S1124. Herein, the first moving object controller 1111 may provide information indicating the occurrence of a collision or an escape situation of the first moving object 1110 to the first vehicle information transceiver 1115.

A portable terminal 1150 in the second moving object 1120 may be provided with an environment in which it is possible to request the confirmation of information of a neighbor moving object (e.g., the first moving object 1110). The portable terminal 1150 may be provided with an information confirmation button that may request the confirmation of information of the first moving object 1110. Herein, the information confirmation request button may be provided in a partial region of an application for vehicle like a navigation application and a black box application. Accordingly, the portable terminal 1150 may identify whether or not the information confirmation button is input. When the information confirmation button is input in step S1127, the portable terminal 1150 may transmit a vehicle information request message requesting vehicle information to the first vehicle information transceiver 1115 in step S1128. Herein, the vehicle information request information may include information for requesting the confirmation of the occurrence of a collision or information for requesting the confirmation of an escape situation. In response to this, the first vehicle information transceiver 1115 that is operated in a stand-by status may confirm a vehicle information request message, identify whether or not a collision of the first moving object 1110 occurs or an escape situation, and in response to the occurrence of a collision or the escape situation, provide a response message including the vehicle information of the first moving object 1110 (i.e., first vehicle information) to the portable terminal 1150 in step S1129. In a situation other than the occurrence of a collision or an escape situation, the first vehicle information transceiver 1115 may provide a rejection message including information indicating that the situation is not the occurrence of a collision or an escape situation to the portable terminal 1150.

The portable terminal 1150 may output the first vehicle information included in the received response message through a display that is provided inside in step S1130. Furthermore, the portable terminal 1150 may provide information on a first vehicle, the occurrence of a collision and an escape situation to an ITSI or a server.

In an embodiment of the present disclosure described in FIGS. 11A and 11B, it is illustrated that the first moving object 1110 confirms whether or not an accident occurs and an escape situation and transmits or broadcasts vehicle information (i.e., first vehicle information), information on a vehicle to which an escape situation occurs is delivered to the second moving object 1120, and the second moving object 1120 provides vehicle information. However, as an alternative to that the first moving object 1110 obtains vehicle information based on transmitted or broadcast information, a neighbor moving object of a moving object to which an escape situation occurs may obtain and provide the vehicle information. Specifically, referring to FIG. 11C, the first moving object controller 1111 installed in the first moving object 1110 may identify whether or not a vehicle collides or an impact amount by using a sensor (e.g., acceleration sensor) mounted in the vehicle and then may determine whether or not an accident occurs in step S1141 based on the identified result, as described in FIGS. 11A and 11B. Next, when the accident occurs in step S1142, the first moving object controller 1111 may identify a travel distance of the first moving object 1110. In addition, the first moving object controller 1111 may identify whether or not a travel distance of the first moving object 1110 exceeds a predetermined threshold of distance (e.g., 10 m) and may determine that the first moving object escapes in step S1143, when the travel distance exceeds the predetermined threshold of distance (e.g., 10 m). Herein, the first moving object controller 1111 may output information indicating the occurrence of an accident or an escape situation of the first moving object 1110 in step S1144. The information indicating the occurrence of an accident or an escape situation may be output through a light, a display, etc. provided in the first moving object 1110. The information indicating the occurrence of an accident or an escape situation may include a light output, which turns on/off according to a predetermined pattern, a text, or an icon that is output in a display.

Figure 12A:
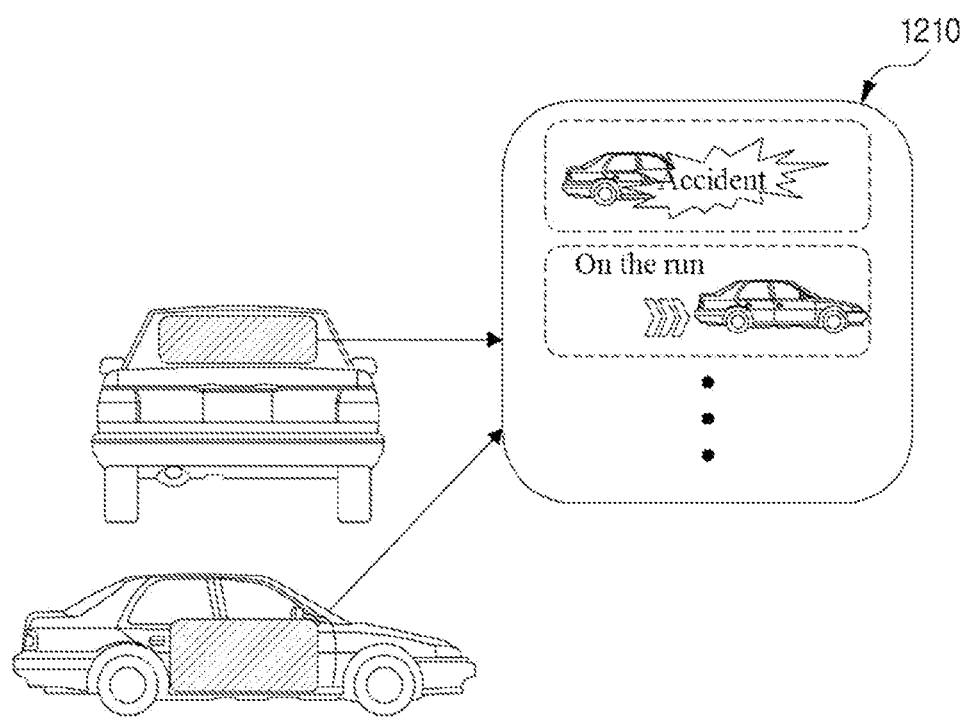
FIGS. 12A and 12B illustrate an operation of displaying an icon or a text showing an occurrence of an accident or an escape situation through an external display of an autonomous vehicle according to an embodiment of the present disclosure.
Figure 12B:
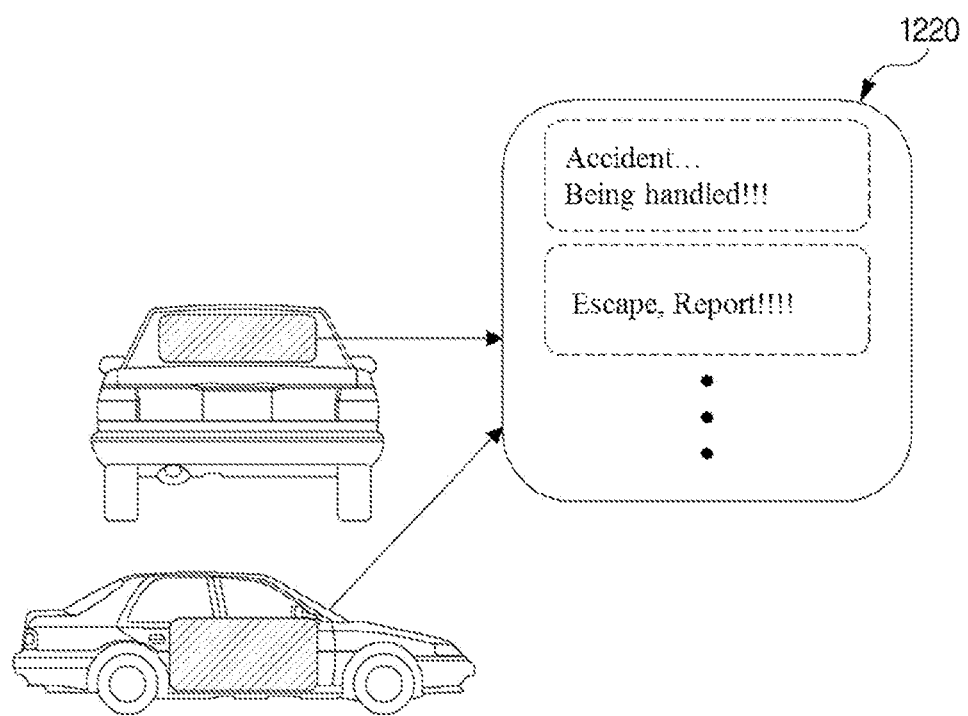

The second moving object 1120 located near the first moving object 1110 may be configured to identify information indicating the occurrence of an accident or an escape situation and may sense the occurrence of an accident or an escape situation through the information indicating the occurrence of the accident or the escape situation in step S1145. When the second moving object 1120 senses the escape situation in step S1146, the second moving object 1120 may deliver an image taken through a black box and the like to the server apparatus 1150 for managing an escape situation or state of a moving object in step S1147. In addition, the server apparatus 1150 for managing an escape situation or state may analyze the received image and identify the information of an escaping vehicle in step S1148. The first moving object controller 1111 may output an icon or a text 1210 and 1220 (refer to FIGS. 12A and 12B) indicating the occurrence of an accident or an escape situation through an external display of the first moving object 1110, and the second moving object 1120 may identify, from an obtained image, whether or not there is the icon or text 1210 and 1220 indicating the occurrence of an accident or an escape situation and what the icon or text 1210 and 1220 mean.

In the present disclosure, each of the moving object controllers may be a processor, a control unit such as an electronic control unit (ECU), or the like, configured to be programmed to perform various controls.

Figure 13:
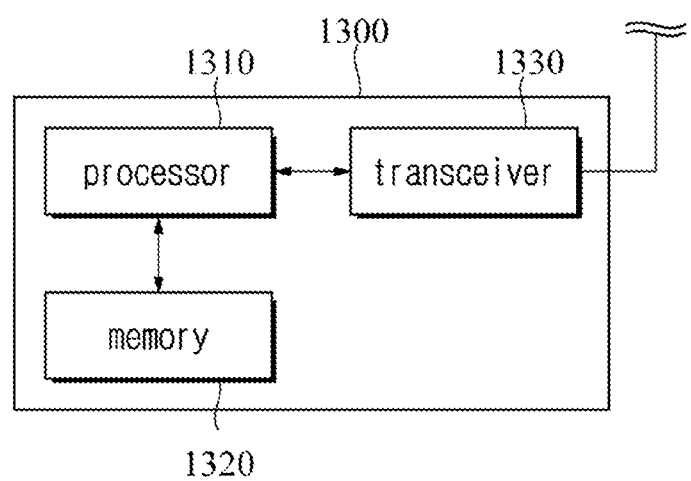
FIG. 13 is a view illustrating an apparatus configuration according to an embodiment of the present disclosure.

FIG. 13 is a view illustrating an apparatus configuration according to an embodiment of the present disclosure.

Referring to FIG. 13, an apparatus may include at least one or more among the above-described moving object, a device, a server and an RSU. In other words, an apparatus may communicate and work with another device, which is not limited to the above-described embodiment. For the above-described operation, an apparatus 1300 may include at least one of a processor 1310, a memory 1320, and a transceiver 1330. In other words, an apparatus may include a necessary configuration for communicating with another apparatus. In addition, an apparatus may include another configuration apart from the above-described configuration. In other words, an apparatus may have a configuration, which includes the above-described apparatus for communicating with another device but is not limited thereto, and may be operated based on what is described above.

Although the exemplary methods of the present disclosure described above are represented by a series of acts for clarity of explanation, they are not intended to limit the order in which the steps are performed, and if necessary, each step may be performed simultaneously or in a different order. In order to implement a method according to the present disclosure, the illustrative steps may include an additional step or exclude some steps while including the remaining steps. Alternatively, some steps may be excluded while additional steps are included.

The various embodiments of the disclosure are not intended to be all-inclusive and are intended to illustrate representative aspects of the disclosure, and the features described in the various embodiments may be applied independently or in a combination of two or more.

In addition, the various embodiments of the present disclosure may be implemented by hardware, firmware, software, or a combination thereof. In the case of hardware implementation, one or more application specific integrated circuits (ASICs), digital signal processors (DSPs), digital signal processing devices (DSPDs), programmable logic devices (PLDs), field programmable gate arrays, a general processor, a controller, a microcontroller, a microprocessor, and the like may be used for implementation.

The scope of the present disclosure includes software or machine-executable instructions (for example, an operating system, applications, firmware, programs, etc.) that enable operations according to the methods of various embodiments to be performed on a device or computer, and a non-transitory computer-readable medium in which such software or instructions are stored and are executable on a device or computer. The one or more application specific integrated circuits (ASICs), the digital signal processor (DSP), the digital signal processing device (DSPD), the programmable logic device (PLD), the field programmable gate array, the processor, the controller, the microcontroller, or the microprocessor may be configured to execute the software or machine-executable instructions to perform the above-described operations so as to control the display device, the airbag module, and/or other elements.

What is claimed is:

1. A moving object escape prevention method comprising:
    controlling, by a processor of a moving object, to autonomously drive the moving object;
    detecting, by the processor, whether a collision occurred by the moving object;
    in response to detecting the collision, transmitting, by the processor, a collision occurrence notification signal and position information of the moving object to an Intelligent Transportation System Infrastructure (ITSI);
    receiving, by the processor, escape-related information from the ITSI,
    wherein the receiving escape-related information includes:
        determining, by the ITSI, whether or not the moving object escapes based on position information of the moving object;
        receiving, by the processor, collision handling information from the ITSI upon determining that the moving object does not escape, and
        receiving, by the processor, an escape warning message from the ITSI when the position information of the moving object changes, and
    wherein the method further comprises:
    after receiving the collision handling information from the ITSI, transmitting, by the processor, a collision handling completion message to the ITSI based on the received collision handling information; and
    when a confirmation message for the collision handling completion message is transmitted to the processor of the moving object from the ITSI, transferring a communication control right to a user of the moving object.

2. The moving object escape prevention method of claim 1, wherein the transmitting a collision occurrence notification signal and position information of the moving object includes:
    transmitting the collision occurrence notification signal and the position information of the moving object based on a broadcast method; and
    transmitting the collision occurrence notification signal and the position information of the moving object to at least one of the ITSI located within a preset distance from the moving object, a user terminal in the moving object, or another moving object.

3. The moving object escape prevention method of claim 1, wherein the transmitting a collision occurrence notification signal and the position information of the moving object includes transmitting, the collision occurrence notification signal and the position information of the moving object at a predetermined interval, and
    wherein the receiving escape-related information further includes receiving, by another moving object, information on whether or not the moving object escapes from the ITSI that determines whether or not the moving object escapes.

4. The moving object escape prevention method of claim 3, wherein the detecting whether a collision occurs includes detecting image information of the moving object by an image sensor and obtaining image information from the ITSI.

5. The moving object escape prevention method of claim 1, further comprising switching the communication control right of the moving object in response to detecting the collision.

6. The moving object escape prevention method of claim 5, wherein the switching the communication control right includes inactivating a user control of a communication function of the moving object.

7. The moving object escape prevention method of claim 5, further comprising, upon detecting the collision, the moving object moves a preset distance based on Minimum Risk Management (MRM), and
    the switching a communication control right includes switching the communication control right after the moving object moves the preset distance.

8. The moving object escape prevention method of claim 1, wherein, upon detecting the collision, the moving object transmits identification information of the moving object to the ITSI.

9. The moving object escape prevention method of claim 8, wherein the collision handling information comprises at least one or more of emergency contact information related to the moving object, organization information related to the moving object, or user information of the moving object.

10. The moving object escape prevention method of claim 1, further comprising, upon detecting the collision: switching, by the processor, a control right for an external information sensing apparatus; and
    transmitting, along with the collision occurrence notification signal and the position information of the moving object, information obtained through the external information sensing apparatus of the moving object to the ITSI.

11. The moving object escape prevention method of claim 10, wherein the external information sensing apparatus is at least one of radar, a camera, or a sensor.

12. The moving object escape prevention method of claim 1, further comprising, upon detecting the collision, setting a maximum speed of the moving object to a preset speed or below.

13. A moving object escape prevention method using an intelligent transportation system infrastructure (ITSI), the method comprises:

receiving, by the ITSI, a collision occurrence notification signal and position information of the moving object from the moving object in response to occurrence of a collision of the moving object;
determining whether or not the moving object escapes based on the position information of the moving object; and
transmitting escape-related information to the moving object,
wherein, when the position information of the moving object remains the same, the ITSI determines that the moving object does not escape and transmits collision handling information to the moving object,
wherein the ITSI receives a collision handling completion message based on the collision handling information from the moving object, and the ITSI transmits a confirmation message for the collision handling completion message so that a communication control right is transferred to a user of the moving object, and
wherein, when the position information of the moving object changes, the ITSI determines that the moving object escapes and transmits an escape warning message to the moving object.

14. The method of claim 13, wherein the receiving a collision occurrence notification signal and position information of the moving object includes receiving the collision occurrence notification signal and the position information that are transmitted in a broadcast method from the moving object.

15. The method of claim 13,
wherein the receiving a collision occurrence notification signal and position information of the moving object includes receiving the collision occurrence notification signal and the position information of the moving object at a predetermined interval, and
wherein the determining whether or not the moving object escapes includes determining whether or not the moving object escapes by comparing current position information and initial position information before the collision of the moving object.

16. The moving object escape prevention method of claim 13, further comprising, upon determining that the moving object escapes, tracking, by the ITSI, a movement route of the moving object by obtaining information on the moving object through another ITSI located within a preset distance from the moving object.

17. The moving object escape prevention method of claim 13, further comprising:
upon detecting the collision, receiving, by the ITSI, identification information of the moving object; and
receiving the collision handling information related to the moving object based on the identification information of the moving object.

18. A moving object equipped with an escape prevention function, the moving object comprising:
a transceiver configured to transmit and receiving a signal; and
a processor configured to control the transceiver,
wherein the processor is configured to:
detect that a collision occurs by the moving object which is configured to move by autonomous driving,
transmit a collision occurrence notification signal and position information of the moving object to an Intelligent Transportation System Infrastructure (ITSI), and
receive escape-related information from the ITSI, wherein whether or not the moving object escapes is determined based on the position information of the moving object through the ITSI, wherein, when the position information of the moving object remains the same, the moving object receives collision handling information from the ITSI,
wherein after receiving the collision handling information from the ITSI, the processor transmits a collision handling completion message to the ITSI based on the received collision handling information, and when a confirmation message for the collision handling completion message is transmitted to the processor of the moving object from the ITSI, the processor transfers a communication control right to a user of the moving object, and wherein, when the position information of the moving object changes, the moving object receives an escape warning message from the ITSI.

19. The moving object of claim 18, wherein, when the collision is detected, the processor deactivates a user's communication control right of the moving object.

20. A moving object escape prevention method comprising:
controlling, by a processor of a moving object, to autonomously drive the moving object;
detecting, by the processor, whether a collision occurred by the moving object;
switching, by the processor, a control right for an external information sensing apparatus upon detecting the collision;
in response to detecting the collision, transmitting, by the processor, a collision occurrence notification signal, position information of the moving object and information obtained through the external information sensing apparatus of the moving object to an Intelligent Transportation System Infrastructure (ITSI);
receiving, by the processor, escape-related information from the ITSI,
wherein the receiving escape-related information includes:
determining, by the ITSI, whether or not the moving object escapes based on position information of the moving object;
receiving, by the processor, collision handling information from the ITSI upon determining that the moving object does not escape, and
receiving, by the processor, an escape warning message from the ITSI when the position information of the moving object changes.

21. A moving object equipped with an escape prevention function, the moving object comprising:
a transceiver configured to transmit and receiving a signal; and
a processor configured to control the transceiver,
wherein the processor is configured to:
detect that a collision occurs by the moving object which is configured to move by autonomous driving,
switch a control right for an external information sensing apparatus upon detecting the collision;
transmit a collision occurrence notification signal, position information of the moving object and information obtained through the external information sensing apparatus of the moving object to an Intelligent Transportation System Infrastructure (ITSI), and
receive escape-related information from the ITSI, wherein whether or not the moving object escapes is determined based on the position information of the moving object through the ITSI, wherein, when the position information of the moving object remains the same, the moving object receives collision handling information from the ITSI, and wherein, when the position information of the moving object changes, the moving object receives an escape warning message from the ITSI.

\* \* \* \* \*